US007970510B2

(12) United States Patent
Hattori

(10) Patent No.: US 7,970,510 B2
(45) Date of Patent: *Jun. 28, 2011

(54) VEHICLE DRIVE CONTROL SYSTEM AND SENSOR UNIT AND TIRE

(75) Inventor: Yutaka Hattori, Kanagawa (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 1074 days.

This patent is subject to a terminal disclaimer.

(21) Appl. No.: 11/718,579

(22) PCT Filed: Nov. 4, 2005

(86) PCT No.: PCT/JP2005/020280
§ 371 (c)(1),
(2), (4) Date: May 3, 2007

(87) PCT Pub. No.: WO2006/049241
PCT Pub. Date: May 11, 2006

(65) Prior Publication Data
US 2007/0260376 A1 Nov. 8, 2007

(30) Foreign Application Priority Data
Nov. 5, 2004 (JP) .................................. 2004-322810

(51) Int. Cl.
*B60C 23/00* (2006.01)
(52) U.S. Cl. ........................................ 701/36; 340/439
(58) Field of Classification Search .................... 701/36, 701/33, 35, 29, 70; 340/439, 442; 73/146.2
See application file for complete search history.

(56) References Cited

U.S. PATENT DOCUMENTS
5,602,524 A * 2/1997 Mock et al. .................... 340/447
(Continued)

FOREIGN PATENT DOCUMENTS
JP 52-109981 9/1977
(Continued)

OTHER PUBLICATIONS
International Search Report for PCT/JP2005/020280 dated Dec. 27, 2005.

*Primary Examiner* — Dalena Tran
(74) *Attorney, Agent, or Firm* — Knobbe Martens Olson & Bear LLP

(57) ABSTRACT

There is provided a vehicle drive control system performing the stability control of a vehicle by highly accurately and easily sensing accelerations generated in each tire and sensing a tire ground contact pattern, a sensor unit thereof and a tire. Using a sensor unit 100 mounted in each tire 2 of a vehicle 1, accelerations generated in X, Y and Z directions are sensed and at the same time, a low frequency noise component and high frequency noise component added to the Z axis direction acceleration signal are extracted. Digital values being the sensing result are transmitted as digital information to a monitor device 200 by radio wave. The monitor device 200 compares many pieces of tire ground contact pattern information preliminarily stored with the digital information to thereby specify a tire ground contact pattern and output the information to a stability control unit 700. The stability control unit 700 performs, based on the acceleration values and the information on tire ground contact pattern obtained, the correction control of driving of a sub-throttle actuator 412 or a brake drive actuator 640.

19 Claims, 22 Drawing Sheets

U.S. PATENT DOCUMENTS 6,259,361 B1 * 7/2001 Robillard et al. ............. 340/447

FOREIGN PATENT DOCUMENTS

| | | |
|---|---|---|
| JP | 05-335828 | 12/1993 |
| JP | 08-298613 | 11/1996 |
| JP | 2001-018775 | 1/2001 |
| JP | 2002-511812 | 4/2002 |
| JP | 2002-137721 | 5/2002 |
| JP | 2002-160616 | 6/2002 |
| JP | 2002-182578 | 6/2002 |
| JP | 2002-340863 | 11/2002 |
| JP | 2003-182476 | 7/2003 |

* cited by examiner

VEHICLE DRIVE CONTROL SYSTEM AND SENSOR UNIT AND TIRE

CROSS REFERENCE TO RELATED APPLICATIONS

This application claims to benefit and priority to and is a U.S. National Phase of PCT International Application Number PCT/JP2005/020280, filed on Nov. 4, 2005, designating the United States of America, which claims priority under U.S.C. §119 to Japanese Application 2004-322810 filed on Nov. 5, 2004. The disclosures of the above-described applications are hereby incorporated by reference in their entirety.

TECHNICAL FIELD

The present invention relates to a vehicle drive control system performing the stability control of a vehicle body during running of the vehicle, and a sensor unit thereof and a tire.

BACKGROUND ART

According to conventional art, when the friction force between the road surface and a tire is reduced in such cases as when the road surface is wet in the rain, the vehicle can skid and move in an unexpected direction at the time when the accelerator is pushed down, causing an accident.

To prevent an accident caused by such skids, sudden acceleration, and soon, there have been developed Anti-Lock Brake System (hereinafter referred to as ABS), Traction Control System, and further a stability control system provided with a YAW sensor, and other systems.

For example, ABS is a system which senses the rotation state of each tire and controls the braking force based on the sensing result to prevent each tire from entering a locking state.

As the rotation state of a tire, it is possible to sense the number of rotations of each tire and the states such as air pressure and distortion, and use the sensing result for the control.

As examples of such control system, there have been known a brake device for an automobile (hereinafter referred to as Patent Document 1) disclosed in Japanese Patent Publication 5-338528), a brake control device (hereinafter referred to as Patent Document 2) disclosed in Japanese Patent Publication 2001-018775, a method and device for controlling a vehicle (hereinafter referred to as Patent Document 3) disclosed in Japanese Patent Publication 2001-182578, a vehicle movement control device (hereinafter referred to as Patent Document 4) disclosed in Japanese Patent Publication 2002-137721, a brake device (hereinafter referred to as Patent Document 5) disclosed in Japanese Patent Publication 2002-160616, and so on.

In Patent Document 1, there is disclosed a brake device in which negative pressure is supplied from a vacuum tank to a vacuum booster linked with a brake pedal, and negative pressure is supplied from a vacuum pump to the vacuum tank, and the vacuum pump is driven by a pump motor, whereby the pump motor is controlled so as to operate the vacuum pump when a state in which deceleration of an automobile reaches a predetermined value is detected by an acceleration sensor 14, thereby preventing the change of an operation feeling at the time of an abrupt brake operation as well as a brake operation immediately after that.

In Patent Document 2, there is disclosed a brake control device including control means which effects ABS control, the control means being provided with: lateral acceleration estimation means for estimating lateral acceleration generated in a vehicle; and comparison and determination means for comparing an estimated lateral acceleration by the lateral acceleration estimation means, an estimated lateral acceleration by vehicle behavior sensing means and a detected lateral acceleration sensed by a lateral acceleration sensor included in the vehicle behavior detecting means and for determining that normal turning corresponding to the rudder angle is under way if the difference between the estimated and sensed accelerations is less than a predetermined value and determining that abnormal turning is underway if the difference is equal to or larger than the predetermined value, whereby the control means is adapted to change the type of control based on whether normal turning or abnormal turning is determined to be under way during the ABS control.

In Patent Document 3, there is disclosed a method and device for controlling a vehicle in which a control signal for adjusting the deceleration and/or the acceleration of a vehicle is formed by a corresponding set value, wherein a correction factor expressing a vehicle acceleration or a vehicle deceleration produced by an inclination of the running road surface is formed, and the correction factor is made to overlap the set value, whereby the setting of deceleration and/or acceleration of the vehicle is improved.

In Patent Document 4, there is disclosed a vehicle movement control device in which skid angle change speed $\beta'$ of the center-of-gravity point as the actual yawing momentum of a vehicle having plural wheels is acquired, and brake fluid pressure $\Delta P$ is applied to one of brakes of left and right rear wheels when the absolute value of the change speed $\beta'$ is equal to or larger than predetermined value $\beta_0'$, thereby generating the yawing moment in a manner in which the more the absolute value of the change speed $\beta'$ is, the more the value of the yawing moment is and at the same time, in a direction to reduce the absolute value of the change speed $\beta'$; even during the control of the yawing moment, determination of whether the slip control is needed or not on the wheel to which the brake fluid pressure $\Delta P$ is applied, continues and, when the slip control is needed, the slip control for keeping a slip ratio within a proper range is executed by controlling the brake fluid pressure $\Delta P$.

In Patent Document 5, there is disclosed a brake device including at least two sensors from among an acceleration sensor for sensing an acceleration in the longitudinal direction of a vehicle, a wheel speed sensor for sensing a wheel speed of each wheel, and a braking pressure sensor for sensing a braking pressure, wherein a target braking pressure is calculated by use of feedback from at least two sensors, and an indicator current is calculated by an indicator current calculation section based on this calculation result, and the indicator current is carried into a brake drive actuator to produce braking force corresponding to the amplitude of the indicator current, whereby even when disturbance occurs or one sensor is in trouble, the abnormal output can be suppressed.

As a method for sensing the number of rotations of a tire, as shown in FIGS. 21 and 22, there is typically used a method which senses the number of rotations of a tire by use of a rotor A1 rotating integrally with a wheel carrier, and a pickup sensor A2. In this method, plural concaves and convexes spaced equally around the circumferential surface of the rotor A1 traverse the magnetic field generated by the pickup sensor A2, whereby the magnetic flux density is varied, generating a pulsative voltage in a coil of the pickup sensor A2; the number of rotations can be detected by sensing this pulse. An exemplary basic principle of this method is disclosed in Japanese Patent Publication 52-109981.

Patent Document 1: Japanese Patent Publication 5-338528
Patent Document 2: Japanese Patent Publication 2001-018775
Patent Document 3: Japanese Patent Publication 2001-182578
Patent Document 4: Japanese Patent Publication 2002-137721
Patent Document 5: Japanese Patent Publication 2002-160616
Patent Document 6: Japanese Patent Publication 52-109981

In the technique disclosed in Patent Document 1, however, while the brake control operation feeling is improved, when the friction force between the tire and road surface changes, it is difficult to set a threshold value for which there are assumed such cases as when the brake torque exceeds the friction force between the tire and road surface, thus causing a skid.

In the techniques disclosed in Patent Documents 2 to 5, compared to the above described technique disclosed in Patent Document 1, more advanced control is performed in which an acceleration of the vehicle itself during running of the vehicle is sensed and the brake control of the vehicle is performed based on this acceleration. However, the friction force between the tire and road surface varies even in the identical vehicle depending on the kind of tire installed in the vehicle and the air pressure thereof. Further, there are vehicles, such as a 4WD vehicle, in which drive control is performed separately for each tire. Consequently, even with the control method which takes into consideration the acceleration of the vehicle itself during its running, highly accurate control may be impossible.

To address the above problems, an object of the present invention is to provide a vehicle drive control system sensing highly accurately and easily accelerations generated in each tire and at the same time, sensing a tire ground contact pattern to thereby perform vehicle stability control, and a sensor unit thereof and a tire.

DISCLOSURE OF THE INVENTION

In order to achieve the above object, according to the present invention, there is constructed a vehicle drive control system including control means for driving each drive actuator for an engine throttle, steering and brake according to a result of sensing a vehicle driving operation state to perform stability control during running of a vehicle and at the same time, including the following constituent elements.

The vehicle drive control system according to the present invention has an acceleration sensor, disposed in each rotation mechanism section including a rotation body positioned in the vehicle body side for securing a tire and allowing the tire to rotate and the tire, and sensing at least one of a first acceleration generated in association with rotation of the tire in a direction orthogonal to a rotation axis and a second acceleration generated in a direction of rotation. Also, the present system has: a plurality of sensor sections converting the sensing result of the acceleration sensor into an electrical signal and performing outputting; and means for eliminating a gravity acceleration component from at least one of the first acceleration and second acceleration sensed by the acceleration sensor to generate a ground contact pattern determination signal of each tire.

Further, the vehicle drive control system according to the present invention has: separation means for separating a predetermined low frequency component and a predetermined high frequency component of the ground contact pattern determination signal; and pattern information storage means for associating tire ground contact pattern information including at least information on tire ground contact area with respect to running road surface and the low frequency component and high frequency component, and preliminarily storing the resultant information. Also, the present system has: ground contact pattern specifying means for specifying a ground contact pattern of each tire with respect to running road surface based on the low frequency component and high frequency component obtained by the separation means and the information stored in the pattern information storage means and outputting this ground contact pattern information; and means for performing the control of correcting the drive of a predetermined drive actuator from among each drive actuator based on the tire ground contact pattern information of each tire outputted from the ground contact pattern specifying means.

According to the vehicle drive control system of the present invention, at least one of the first acceleration generated in association with tire rotation in a direction orthogonal to the rotation axis and the second acceleration generated in a direction of rotation is sensed by the acceleration sensor, and this sensing result is converted into an electrical signal and outputted.

Further, for each sensor section, the gravity acceleration component is eliminated from at least one electrical signal of the first acceleration and second acceleration sensed by the acceleration sensor to generate the ground contact pattern determination signal of each tire, and the predetermined low frequency component and the predetermined high frequency component of the ground contact pattern determination signal are separated.

Also, the tire ground contact pattern information including at least the information on tire ground contact area with respect to running road surface and the low frequency component and high frequency component are associated with each other and preliminarily stored in the pattern information storage means.

With the above arrangement, based on the low frequency component and high frequency component obtained by the separation means and the information stored in the pattern information storage means, a ground contact pattern of each tire with respect to a running road surface is specified. Further, based on the specified tire ground contact pattern information of each tire, the control of correcting the drive of a predetermined drive actuator among each drive actuator is performed.

Also, according to the present invention, in the above vehicle drive control system, the sensor section has means for sensing a third acceleration generated in a direction of the rotation axis and converting the sensing result into an electrical signal and performing outputting, and the vehicle drive control system comprises: the pattern information storage means having means for associating tire ground contact pattern information including at least information on tire ground contact area and information on tire ground contact region with respect to running road surface and the low frequency component and high frequency component and the third acceleration, and preliminarily storing the resultant information; and the ground contact pattern specifying means for specifying a tire ground contact pattern with respect to running road surface based on the low frequency component and high frequency component and the third acceleration and the information stored in the pattern information storage means and outputting this tire ground contact pattern information.

According to this system, based on the low frequency component and high frequency component and the third acceleration and the information stored in the pattern information storage means, a tire ground contact pattern with respect to running road surface is specified, and based on the specified tire ground contact pattern information of each tire, the control of correcting the drive of a predetermined drive actuator from among each drive actuator is performed.

Also, according to the present invention, there is provided the above vehicle drive control system, wherein the sensor section has means for sensing a third acceleration generated in a direction of the rotation axis and converting the sensing result into an electrical signal and performing outputting, and the vehicle drive control system comprises: signal combining means for combining an electrical signal of the low frequency component and high frequency component and an electrical signal of the third acceleration and outputting an electrical signal obtained by combining these three signals; the pattern information storage means having means for associating tire ground contact pattern information including at least information on tire ground contact area and information on tire ground contact region with respect to running road surface and the low frequency component and high frequency component and the combination signal, and preliminarily storing the resultant information; and the ground contact pattern specifying means for specifying a tire ground contact pattern with respect to running road surface based on the low frequency component and high frequency component and the combination signal obtained by the signal combining means and the information stored in the pattern information storage means and outputting this tire ground contact pattern information.

According to this system, based on the low frequency component and high frequency component and the combination signal and the information stored in the pattern information storage means, a tire ground contact pattern with respect to running road surface is specified, and based on the specified tire ground contact pattern information of each tire, the control of correcting the drive of a predetermined drive actuator from among each drive actuator is performed.

Also, according to the present invention, in the above vehicle drive control system, in order to improve the accuracy of sensing a tire ground contact pattern, the sensor section is configured to sense accelerations in different directions at one given position.

Also, according to the present invention, in the above vehicle drive control system, sensing can be performed by the acceleration sensor up to an acceleration larger by a predetermined amount than a maximum acceleration generated by rotation of the tire.

With such configuration, in both positive and negative directions, sensing can be performed up to an acceleration larger by the predetermined amount than the maximum acceleration. Accordingly, there can be sensed a noise component generated according to the state of running road surface other than running acceleration, gravity acceleration and centrifugal force.

Also, according to the present invention, in the above vehicle drive control system, in order to separate the low frequency component of the ground contact pattern determination signal, the separation means includes two or more low-pass filters or band-pass filters having a different pass band and at the same time, includes means for combining and outputting electrical signals outputted from each filter.

Since two or more filters are used in this manner, a shift in phase produced according to signal frequency when passing through the filter can be reduced.

Also, according to the present invention, in the above vehicle drive control system, in order to separate the high frequency component of the ground contact pattern determination signal, the separation means includes two or more high-pass filters or band-pass filters having a different pass band and includes means for combining and outputting electrical signals outputted from each filter.

Since two or more filters are used in this manner, a shift in phase produced according to signal frequency when passing through the filter can be reduced.

Also, according to the present invention, in the above vehicle drive control system, the filter is constituted of an active type filter.

Also, according to the present invention, in order to achieve the above object, a sensor unit usable in the above system is constructed.

The sensor unit is one with an acceleration sensor disposed in a tire of a vehicle, sensing an acceleration generated in association with running of the vehicle, and comprises: the acceleration sensor sensing at least one of a first acceleration generated in association with rotation of the tire in a direction orthogonal to a rotation axis and a second acceleration generated in a direction of rotation; means for converting the sensing result of the acceleration sensor into an electrical signal and performing outputting; means for eliminating a gravity acceleration component from at least one electrical signal of the sensed first acceleration and second acceleration to generate a ground contact pattern determination signal; separation means for separating a predetermined low frequency component and a predetermined high frequency component of the ground contact pattern determination signal; means for converting the low frequency component and high frequency component separated by the separation means into a digital value; and means for transmitting digital information including the digital value.

Also, according to the present invention, in order to achieve the above object, a tire with the sensor unit is constructed.

The vehicle drive control system of the present invention allows proper control during running of the vehicle, thus improving stability during running. Also, tire distortion quantity, vehicle skid, wheelspin, tire grip and the like can be estimated from the accelerations. Accordingly, when these are used for vehicle brake control, the control can be performed with higher accuracy.

According to the sensor unit of the present invention, to make it possible to highly accurately and easily sense the information required for the above system, it is sufficient to mount the unit in a predetermined position of the tire.

According to the tire of the present invention, since the above sensor unit is provided, the information required for the above system can be highly accurately and easily sensed.

BRIEFLY DESCRIBE OF THE DRAWINGS

DESCRIPTION OF SYMBOLS

1 . . . vehicle, 2 . . . tire, 3 . . . axle, 4 . . . tire house, 100 . . . sensor unit, 110 . . . antenna, 120 . . . antenna switch, 130 . . . rectifier circuit, 131, 132 . . . diode, 133 . . . capacitor, 134 . . . resistor, 140 . . . central processing section, 141 . . . CPU, 142 . . . D/A converter circuit, 143 . . . storage section, 150 . . . transmitting section, 151 . . . oscillator circuit, 152 . . . modulator circuit, 153 . . . high frequency amplifier circuit, 160 . . . sensor section, 161 . . . signal processing circuit, 161-10 . . . basic waveform elimination circuit, 161-11 . . . amplifier circuit, 161-12 . . . low-pass filter, 161-13 . . . phase inverter circuit, 161-14 . . . arithmetic circuit, 161-20 . . . first separation circuit, 161-21 . . . low-pass filter, 161-22, 161-23 . . . band-pass filter, 161-24 . . . arithmetic circuit, 161-30 . . . second separation circuit, 161-31, 161-32 . . . band-pass filter, 161-33 . . . high-pass filter, 161-34 . . . arithmetic circuit, 161-40 . . . arithmetic circuit, 162 . . . A/D converter section, 200 . . . monitor device, 210 . . . radiation unit, 211 . . . antenna, 212 . . . transmitting section, 220 . . . receiving wave unit, 221 . . . antenna, 222 . . . detector wave section, 223 . . . intensity sensing section, 230 . . . control section, 240 . . . arithmetic section, 250 . . . pattern information storage section, 301 . . . cap tread, 302 . . . undertread, 303A, 303B . . . belt, 304 . . . carcass, 305 . . . tire main body, 306 . . . rim, 410 . . . engine, 411 . . . accelerator pedal, 412 . . . sub-throttle actuator, 413 . . . main throttle position sensor, 414 . . . sub-throttle position sensor, 421 . . . steering wheel, 422 . . . rudder angle sensor, 510, 520 . . . rotation number sensor, 610 . . . brake pedal, 620 . . . master cylinder, 630 . . . pressure control valve, 640 . . . brake drive actuator, 700 . . . stability control unit, 10 . . . semiconductor acceleration sensor, 11 . . . pedestal, 12 . . . silicon substrate, 13 . . . diaphragm, 13a to 13d . . . diaphragm piece, 14 . . . thick film section, 15 . . . plumb bob, 18A, 18B . . . support body, 181 . . . outer frame section, 182 . . . supporting column, 183 . . . cantilever section, 184 . . . protrusion section, 184a . . . protrusion-section tip end, 31A to 31C . . . voltage sensing section, 32A to 32C . . . direct current power supply, Rx1 to Rx4, Ry1 to Ry4, Rz1 to Rz4 . . . piezo resistor (diffusion resistor)

BEST MODE FOR CARRYING OUT THE INVENTION

One embodiment of the present invention will be described below with respect to the drawings.

Figure 1:
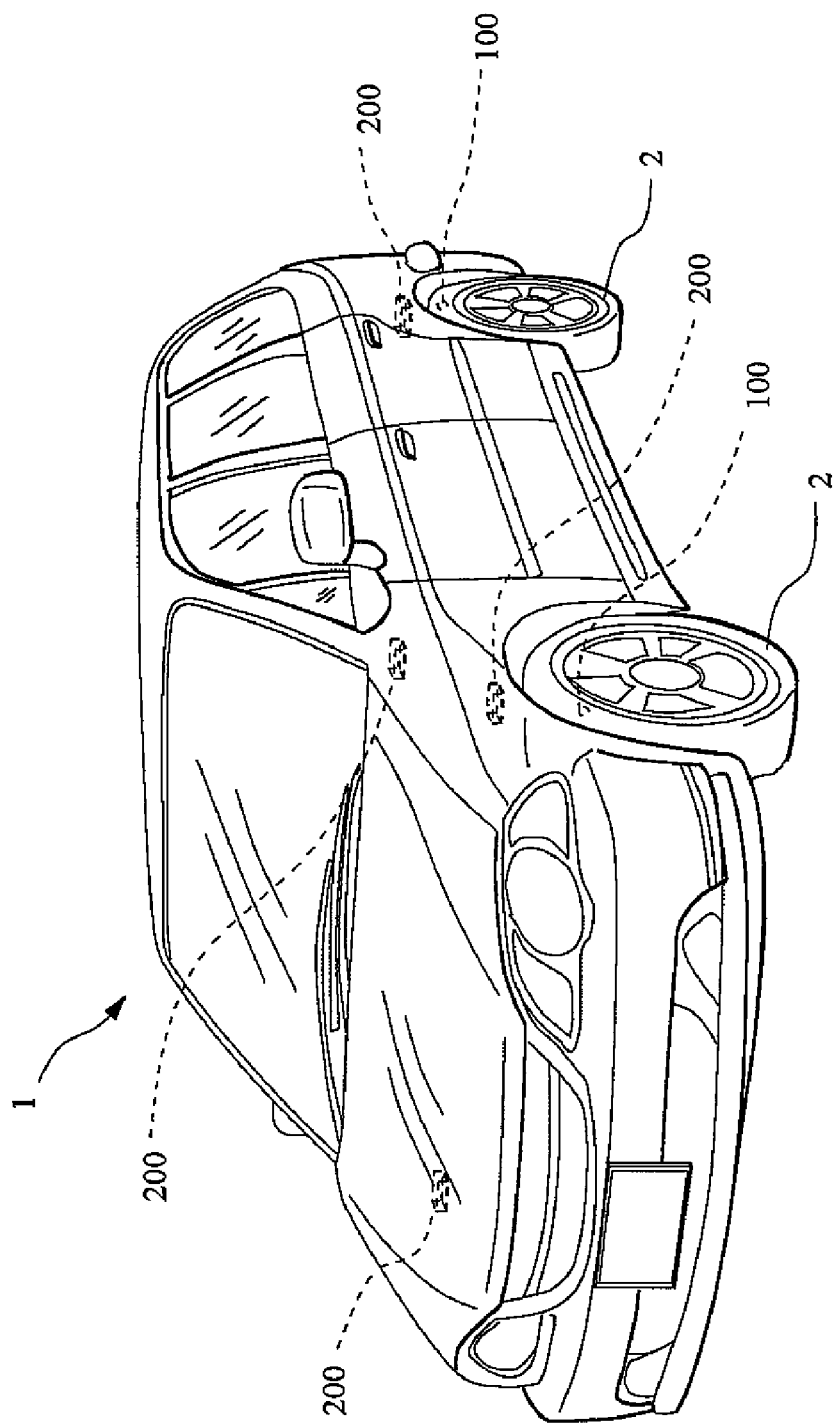
FIG. 1 is an external view showing the arrangement of a monitor device and sensor unit according to one embodiment of the present invention.
Figure 2:
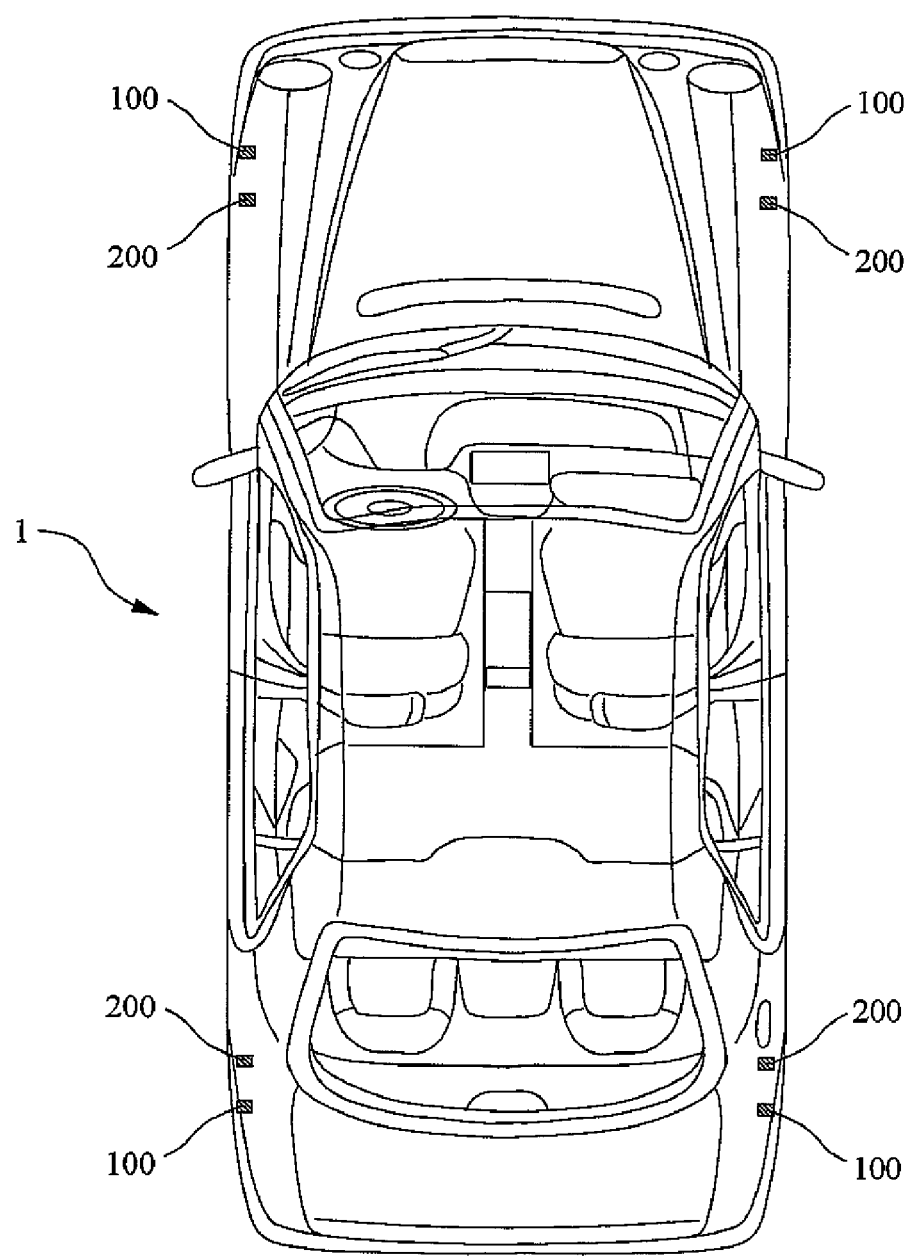
FIG. 2 is a plan view showing the arrangement of a monitor device and sensor unit according to one embodiment of the present invention.
Figure 3:
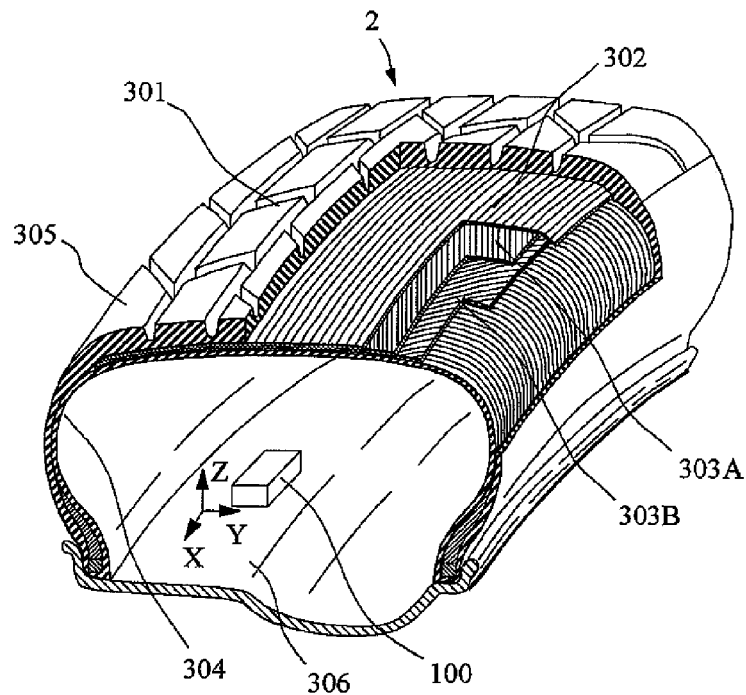
FIG. 3 is a view for explaining the location of placement of the sensor unit in a tire according to the one embodiment of the present invention.
Figure 4:
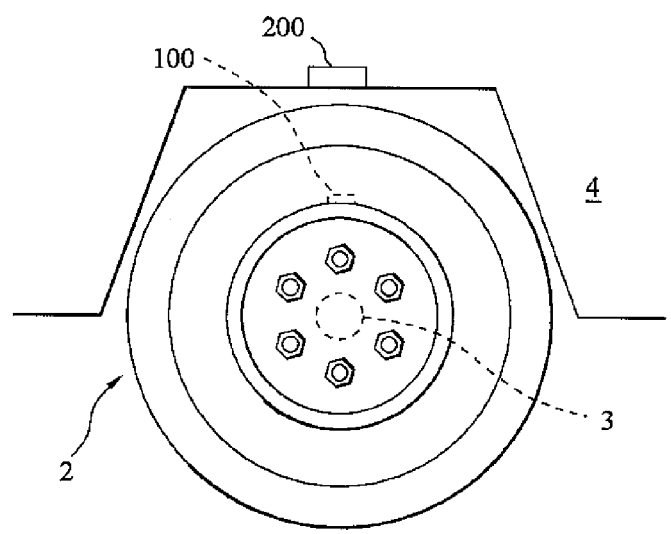
FIG. 4 is a view showing a tire inside a tire house according to the one embodiment of the present invention.
Figure 5:
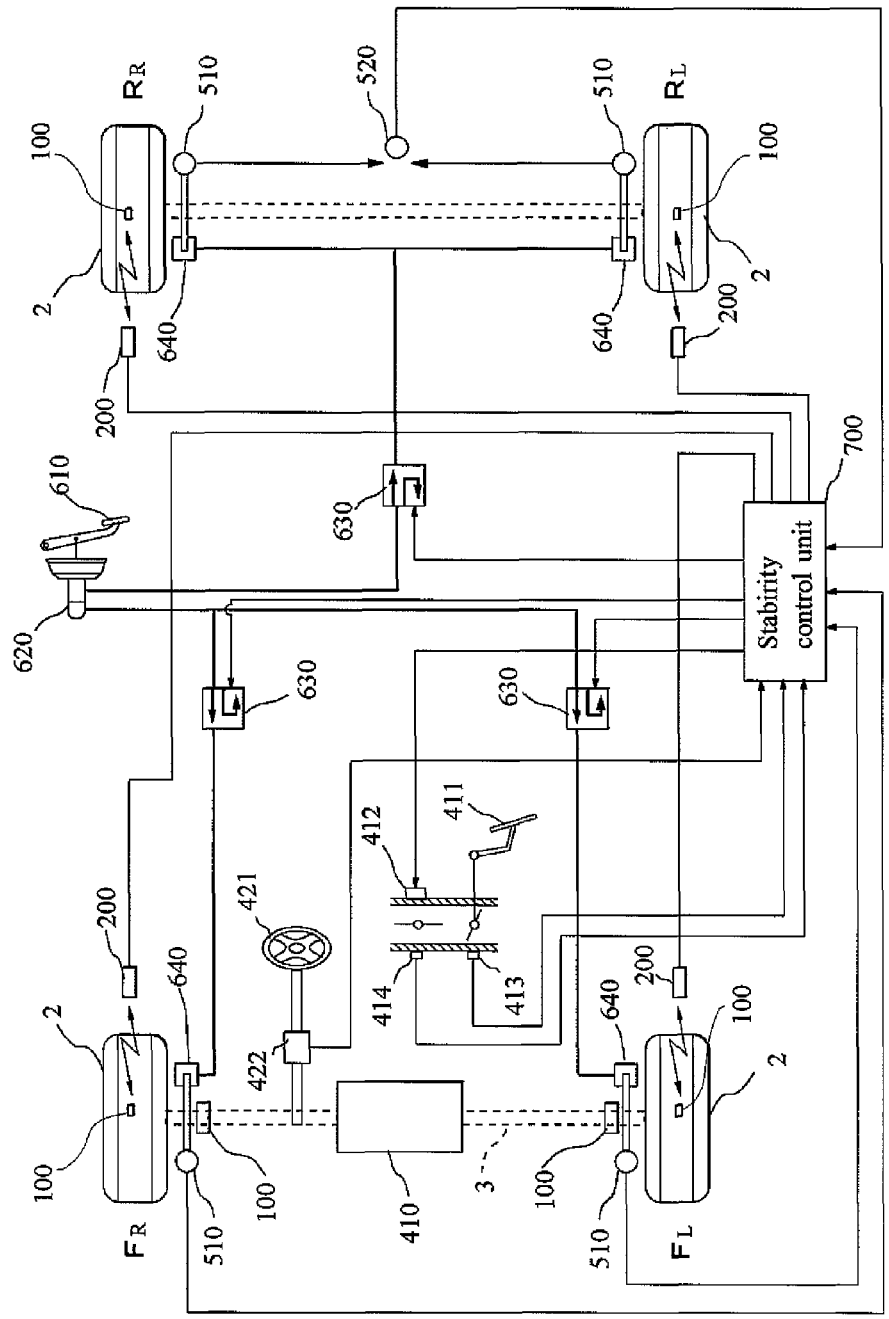
FIG. 5 is a configuration diagram showing a vehicle drive control system according to the one embodiment of the present invention.

FIG. 1 is an external view showing the arrangement of a monitor device and sensor unit according to one embodiment of the present invention. FIG. 2 is a plan view showing the arrangement of a monitor device and sensor unit according to one embodiment of the present invention. FIG. 3 is a view for explaining the location of placement of the sensor unit in a tire according to the one embodiment of the present invention. FIG. 4 is a view showing a tire inside a tire house according to the one embodiment of the present invention. FIG. 5 is a configuration diagram showing a vehicle drive control system according to the one embodiment of the present invention. In the present embodiment, a four-wheel vehicle drive control system is described by means of an example.

In FIGS. 1 and 2, reference numeral 1 denotes a vehicle, 2 denotes a tire (wheel), 100 denotes a sensor unit, and 200 denotes a monitor device. According to the present embodiment, in the sensor unit 100 and the monitor device 200, respective electrical circuits are contained in a small housing having insulation properties and radio wave transparency. Four sensor units 100 are each attached to the tire 2 of the vehicle 1, and four monitor units 200 are disposed in respective tire houses 4. The sensor units 100 correspond to the monitor devices 200, respectively.

As shown in FIGS. 3 and 4, the tire 2 is, for example, a known tubeless radial tire, and includes according to the present embodiment, a wheel and rim. The tire 2 is composed of a tire main body 305, a rim 306 and a wheel (not shown). The tire main body 305 is composed of a known cap tread 301, an undertread 302, belts 303A and 303B, a carcass 304, and so on. Also, according to the present embodiment, as shown in FIG. 3, the tire 2 includes the sensor unit 100, and this sensor unit 100 is secured to the rim 306. In the present embodiment, the following description will be given with the rotation direction of the tire 2 being X axis direction, the rotation axis direction of the tire 2 being Y axis direction, and the radius direction around the rotation axis of the tire 2 being Z axis direction.

In FIG. 5, reference numeral 2 denotes a tire; 3 an axle; 100 a sensor unit; 200 a monitor device; 410 an engine; 411 an accelerator pedal; 412 a sub-throttle actuator; 413 a main throttle position sensor; 414 a sub-throttle position sensor; 421 a steering wheel; 422 a rudder angle sensor; 510 and 520 a tire rotation number sensor; 610 a brake pedal; 620 a brake master cylinder; 630 a pressure control valve controlling brake oil pressure; 640 a brake drive actuator; 700 a stability control unit.

The stability control unit 700 is constituted of a control circuit including a known CPU and imports a sensing result outputted from the sensors 510 and 520 sensing a rotation number of each tire 2 attached to the vehicle 1 and a sensing result outputted from the throttle position sensors 413 and 414, the rudder angle sensor 422 and the monitor device 200 to perform stability control.

More specifically, at the time of acceleration, the accelerator pedal 411 is pushed down to open the main throttle, whereby fuel is sent into the engine 410 to increase the rotation number of the engine 410. At the time of braking, the brake pedal 610 is pushed down to increase the oil pressure within the master cylinder 620, and this oil pressure is transmitted via the pressure control valve to the brake drive actuator 640 of each tire 2, whereby braking force is applied to the rotation of each tire 2.

The stability control unit 700 performs the electrical control of the operation state of the sub-throttle actuator 412 based on a sensing result outputted from the sensors 510 and 520 sensing a rotation number of each tire 2, a sensing result of the rudder angle sensor 422, and a sensing result outputted from the monitor device 200. Further, the stability control unit 700 performs the electrical control of the operation state of each pressure control valve 630 and thereby controls the drive of the brake drive actuator 640 to hold the stability of the vehicle and at the same time, performs automatic control to prevent the tire 2 from being locked and slipping.

The sensor unit 100 is, as described above, secured to a predetermined position in the rim 306 of the tire 2, and a later-described acceleration sensor arranged in this sensor unit 100 senses accelerations in the directions of the X axis, Y axis and Z axis in each tire 2. The sensed accelerations are converted into a digital value. Also, the sensor unit 100 converts into a digital signal a signal obtained by applying a later-described predetermined processing to the digital values of the sensed accelerations and the sensed acceleration signals. Further, the sensor unit 100 generates and transmits digital information including these digital values. In this digital information, in addition to the acceleration digital values, there is included identification information unique to each sensor unit 100.

Figure 6:
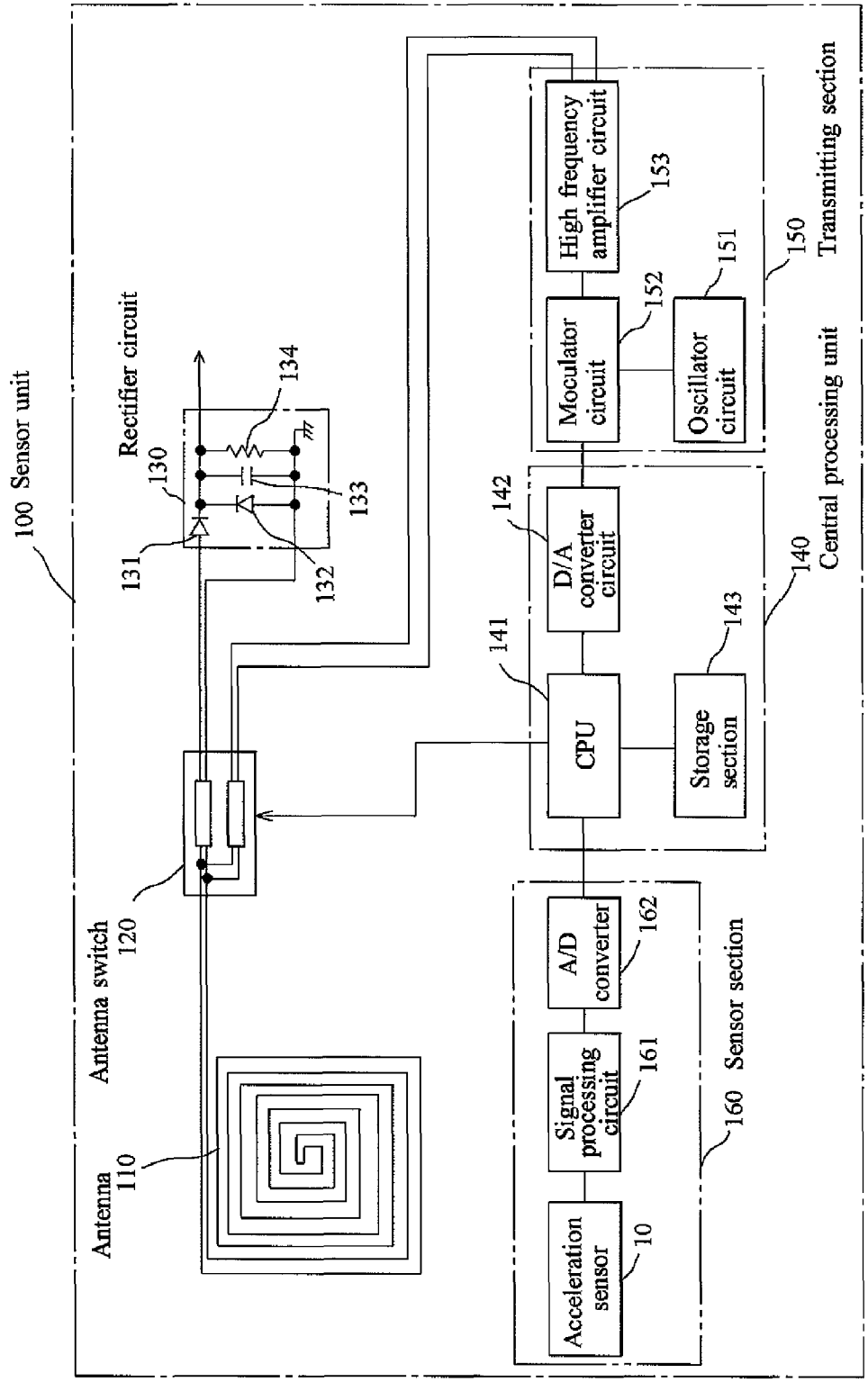
FIG. 6 is a block diagram showing an electrical circuit of the sensor unit according to the one embodiment of the present invention.

As an illustrative example of the electrical circuit of the sensor unit 100, there is a circuit shown in FIG. 6. More specifically, in the illustrative example shown in FIG. 6, the sensor unit 100 is constituted of an antenna 110, an antenna switch 120, a rectifier circuit 130, a central processing section 140, a transmitting section 150 and a sensor section 160.

The antenna 110 serves to communicate with the monitor device 200 by use of radio wave and is adjusted to a predetermined frequency (first frequency), for example, of 2.4 GHz band.

The antenna switch 120 is composed of an electrical switch or the like, for example, and performs, according to control from the central processing section 140, the switching between the connection between the antenna 110 and rectifier circuit 130 and the connection between the antenna 110 and transmitting section 150.

The rectifier circuit 130 is composed of diodes 131 and 132, a capacitor 133 and a resistor 134, constituting a known full-wave rectifier circuit. To the input side of this rectifier circuit 130, there is connected the antenna 110 via the antenna switch 120. The rectifier circuit 130 rectifies high frequency current induced in the antenna 110 to convert it into direct current and outputs this as a drive power source for the central processing section 140, the transmitting section 150 and the sensor section 160. As the capacitor 133, there is used a known super capacitor known as high-capacity capacitor.

The central processing section 140 is constituted of a known CPU 141, a digital/analog (hereinafter referred to as "D/A") converter circuit 142 and a storage section 143.

The CPU 141 operates based on a program stored in a semiconductor memory of the storage section 143 and when driven by receiving electric energy, performs a processing of generating digital information including an acceleration sensing result acquired from sensor section 160 and other digital values and later-described identification information, and sending this digital information to the monitor device 200. In the storage section 143, there is preliminarily stored the identification information unique to the sensor unit 100. According to the present embodiment, programming is made such that the central processing section 140 performs transmitting for 0.30 milliseconds at an interval of 0.45 milliseconds to send the digital information to the monitor device 200. However, these time values are preferably set according to system configuration.

The storage section 143 is composed of an ROM having recorded thereon a program for operating the CPU 141, and an electrically rewritable nonvolatile semiconductor memory such as an EEPROM (electrically erasable programmable read-only memory). The identification information unique to each sensor unit 100 is preliminarily stored in an area designated as non-rewritable area in the storage section 143 during manufacture.

The transmitting section 150 is constituted of an oscillator circuit 151, a modulator circuit 152 and a high-frequency amplifier circuit 153 and modulates by the modulator circuit 152, a carrier wave of a frequency of 2.45 GHz band generated by the oscillator circuit 151 composed of a known PLL circuit etc. based on an information signal received from the central processing section 140, and supplies this as a high-frequency current of a predetermined frequency (second frequency) of 2.45 GHz band different from the first frequency to the antenna 110 via the high-frequency amplifier circuit 153 and antenna switch 120. In the present embodiment, the first frequency and second frequency are set to a different frequency. However, the first frequency and second frequency may be set to the same frequency and the transmitting/receiving timing between the sensor unit 100 and monitor device 200 may be synchronized.

The sensor section 160 is constituted of an acceleration sensor 10, a signal processing circuit 161 and an A/D converter section 162.

The acceleration sensor 10 is constituted of a semiconductor acceleration sensor formed of MEMS (Micro Electro Mechanical Systems) as shown in FIGS. 7 to 10.

Figure 7:
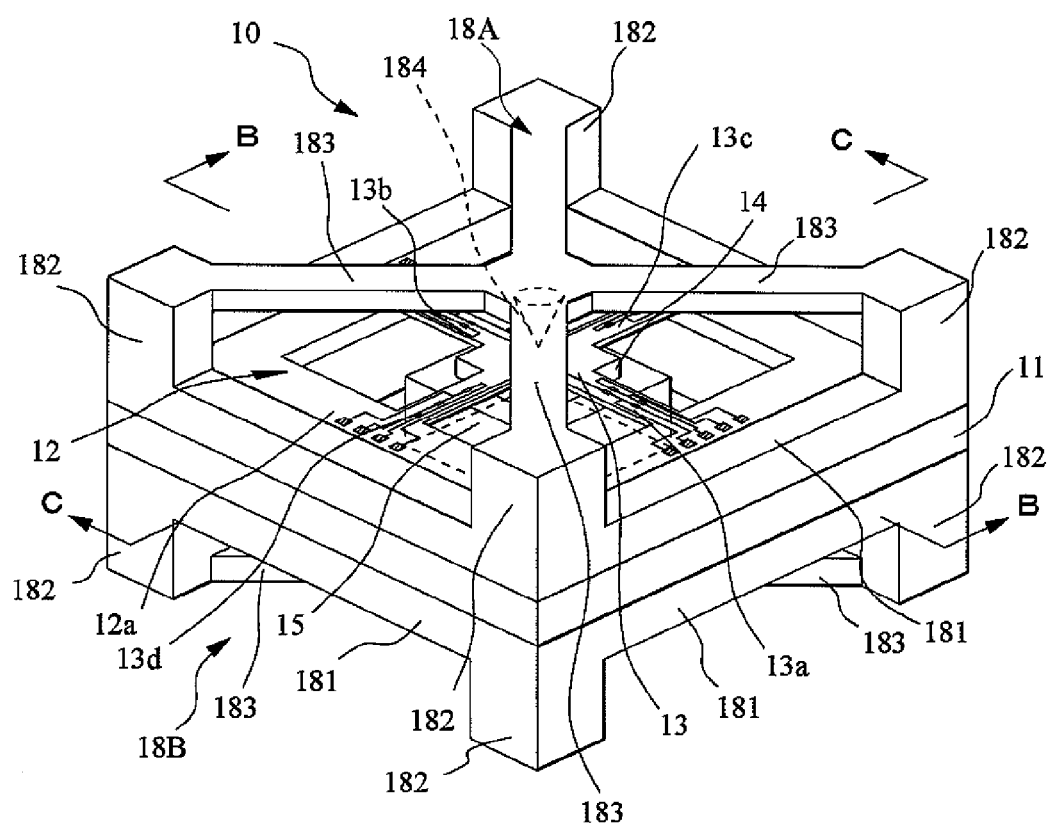
FIG. 7 is an external perspective view showing a semiconductor acceleration sensor according to the one embodiment of the present invention.
Figure 8:
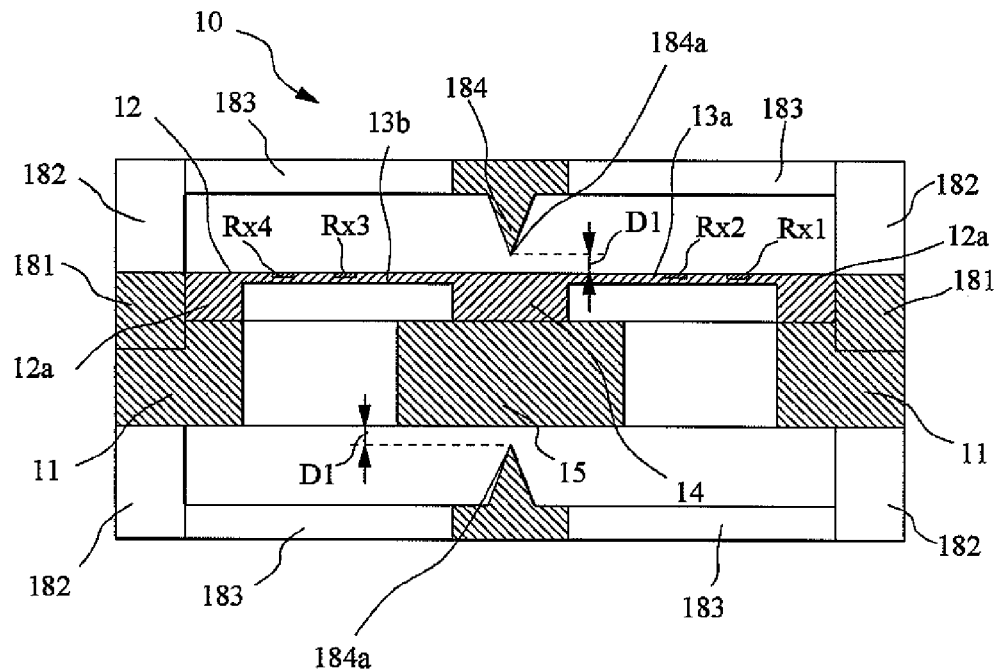
FIG. 8 is a cross-sectional view observed from the arrow direction along the line B-B of FIG. 7.
Figure 9:
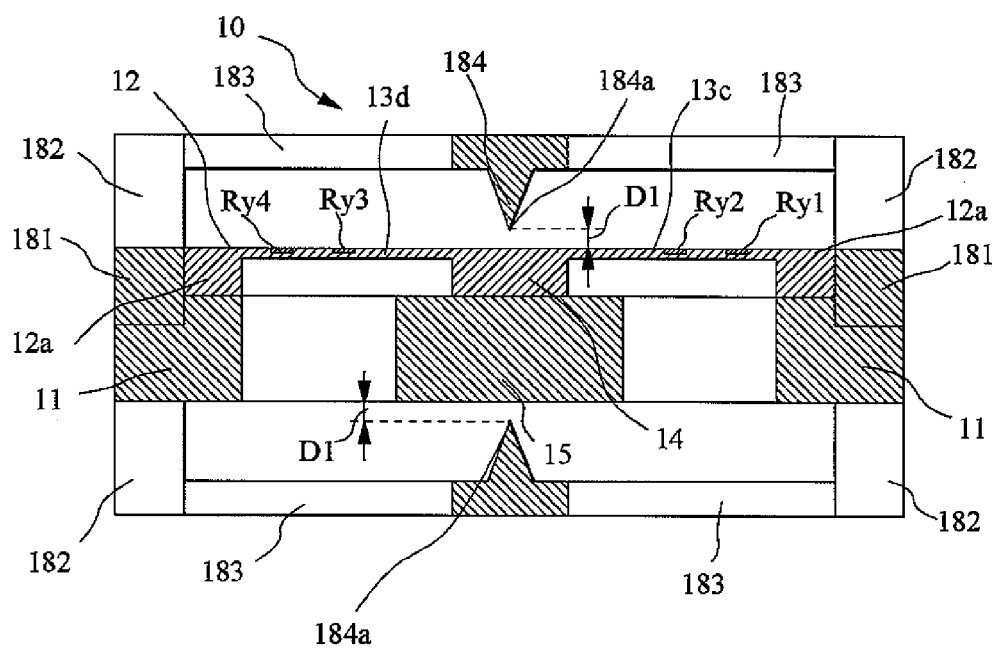
FIG. 9 is a cross-sectional view observed from the arrow direction along the line C-C of FIG. 7.
Figure 10:
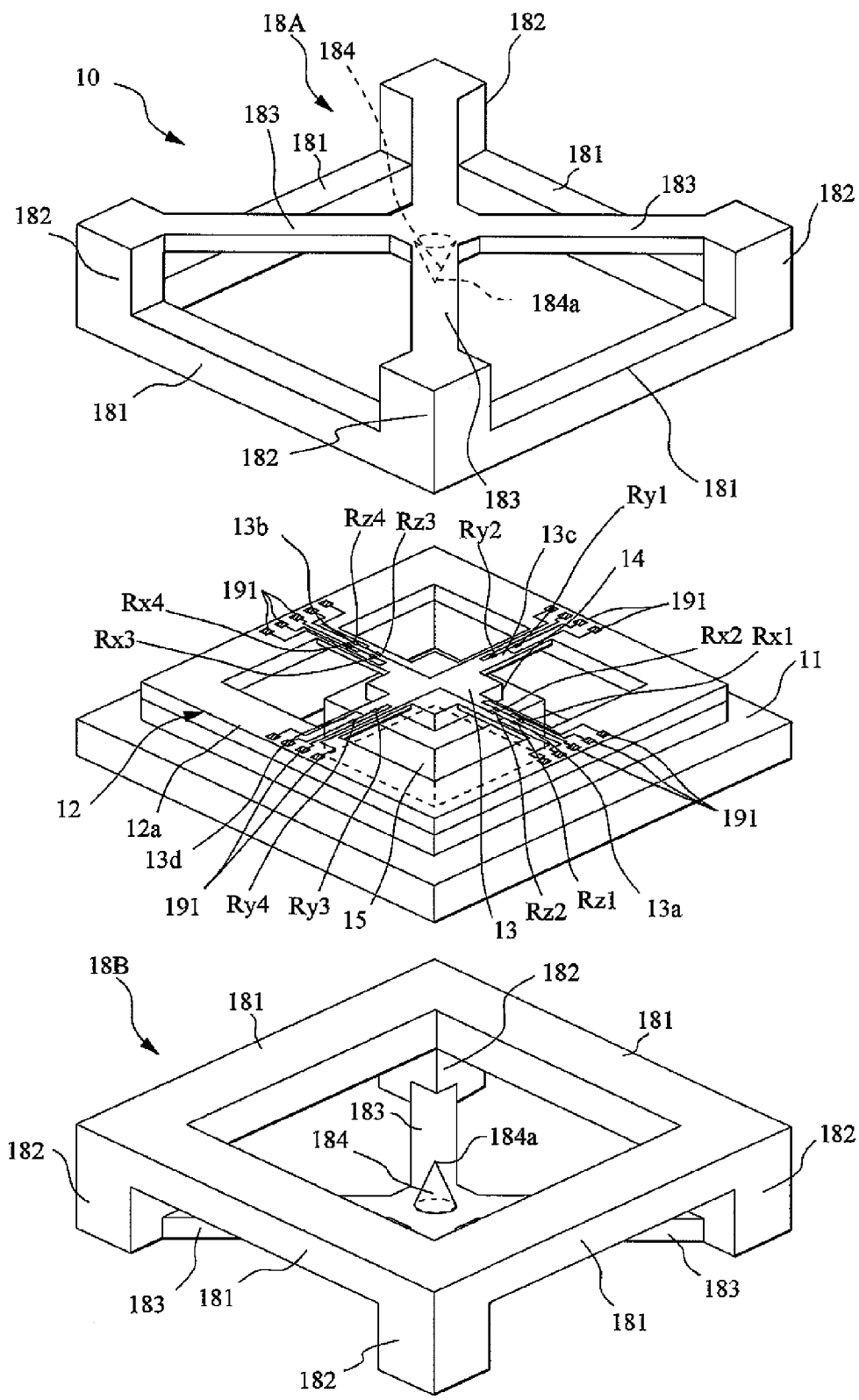
FIG. 10 is a broken perspective view showing the semiconductor acceleration sensor according to the one embodiment of the present invention.

FIG. 7 is an external perspective diagram showing a semiconductor acceleration sensor according to the one embodiment of the present invention. FIG. 8 is a cross-sectional view observed from the arrow direction along the line B-B of FIG. 7. FIG. 9 is a cross-sectional view observed from the arrow direction along the line C-C of FIG. 7. FIG. 10 is an exploded perspective diagram.

In the drawings, reference numeral 10 denotes a semiconductor acceleration sensor which is constituted of a pedestal 11, a silicon substrate 12 and support bodies 18A and 18B.

The pedestal 11 has a rectangular frame shape. On one opening surface of the pedestal 11, there is mounted the silicon substrate 12 (silicon wafer). To the outer-circumferential section of the pedestal 11, there is secured an outer frame section 181 of the support bodies 18A and 18B.

In the opening of the pedestal 11, there is disposed the silicon substrate 12; in the central part within the wafer outer-circumferential frame section 12a, there is formed a diaphragm 13 of thin film having a cross shape; on the upper surface of each of the diaphragm pieces 13a to 13d, there are formed piezo resistors (diffusion resistors) Rx1 to Rx4, Ry1 to Ry4, Rz1 to Rz4.

Figure 11:
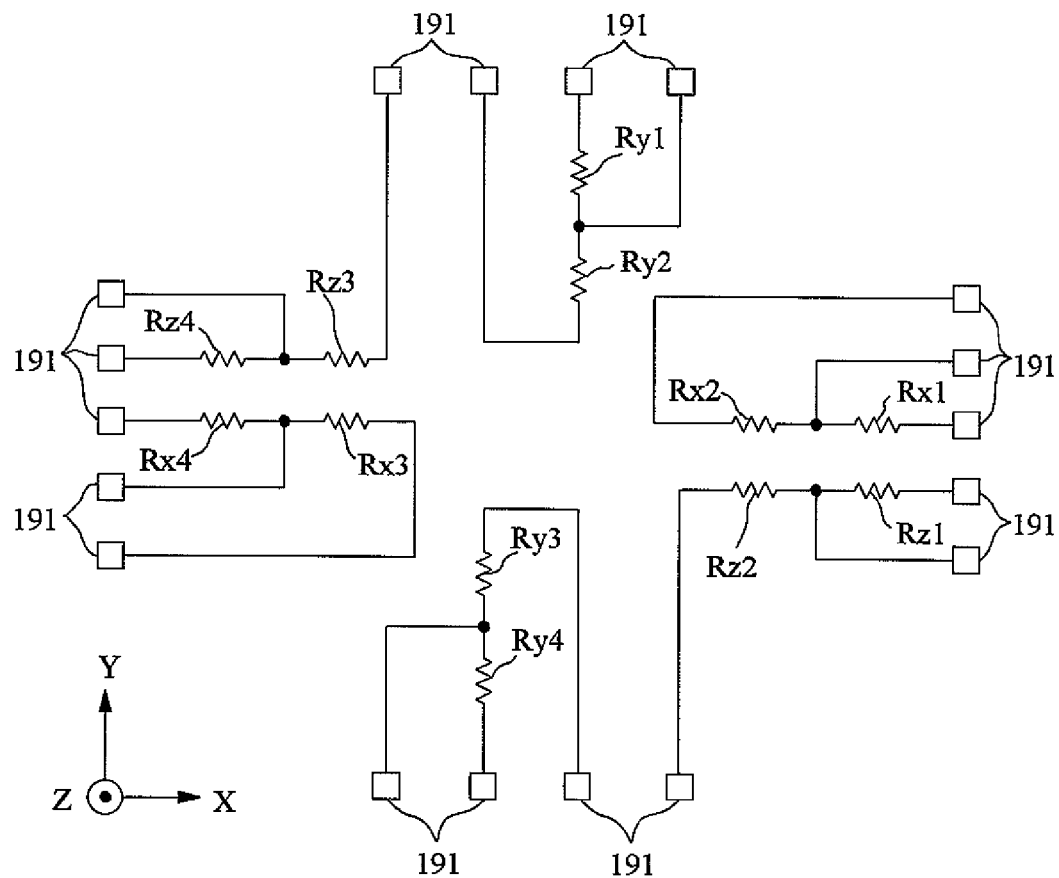
FIG. 11 is a configuration diagram showing an electrical circuit of the semiconductor acceleration sensor according to the one embodiment of the present invention.

More specifically, of the diaphragm pieces 13a and 13b disposed on a single line, in one diaphragm piece 13a, there are formed the piezo resistors Rx1, Rx2, Rz1 and Rz2; in the other diaphragm piece 13b, there are formed the piezo resistors Rx3, Rx4, Rz3 and Rz4. Also, of the diaphragm pieces 13c and 13d disposed in a single line orthogonal to the diaphragm pieces 13a and 13b, in one diaphragm piece 13c, there are formed the piezo resistors Ry1 and Ry2; in the other diaphragm piece 13d, there are formed the piezo resistors Ry3 and Ry4. Further, these piezo resistors Rx1 to Rx4, Ry1 to Ry4, and Rz1 to Rz4 are connected as shown in FIG. 11 so that they can constitute a resistor bridge circuit for sensing accelerations in the directions of the X axis, Y axis and Z axis orthogonal to each other. The piezo resistors are connected to connection electrodes 191 disposed on the surface of the outer-circumferential section of the silicon substrate 12.

Further, on one face side of the central part of the diaphragm 13 in the crossing section of the diaphragm pieces 13a to 13d, there is formed a thick film section 14; on the surface of the thick film section 14, there is mounted a plumb bob 15 having a rectangular solid shape, made of, for example, glass.

Meanwhile, the above described support bodies 18A and 18B are each constituted of the outer frame section 181 having a rectangular frame shape, four supporting columns 182 installed in the four corners of the fixed section, a cantilever section 183 having a cross shape disposed so as to join the tip ends of each supporting column, and a protrusion section 184 having a cone shape disposed in the central, crossing part of the cantilever section 183.

The outer frame section 181 is fit and secured into the outer-circumferential section of the pedestal 11 to be secured, so that the protrusion section 184 is positioned in the other face side of the diaphragm 13, i.e., in the side where there is not the plumb bob 15. Here, a setting is made such that the tip end 184a of the protrusion section 184 is positioned at distance D1 from the surface of the diaphragm 13 or plumb bob 15. The distance D1 is set to a value in which the displacement of each of the diaphragm pieces 13a to 13d can be limited by the protrusion section 184 so that the diaphragm pieces are not stretched excessively even when an acceleration is generated in a direction orthogonal to the face of the diaphragm 13 and force having a predetermined value or more caused by the acceleration is exerted on both face sides of the diaphragm 13.

Also, the acceleration sensor 10 is configured so that sensing is possible up to an acceleration larger by a predetermined amount than a maximum acceleration produced by rotation of the tire 2 in each of the directions of the X axis, Y axis and Z axis. For example, when the maximum acceleration produced by rotation of the tire 2 is ±nG (n being an integer), sensing is possible up to ±3 nG.

Figure 12:
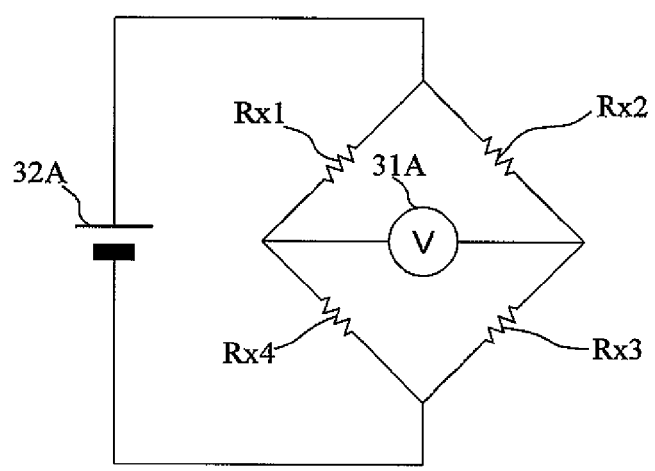
FIG. 12 is a view showing a bridge circuit sensing an acceleration in an X axis direction using the semiconductor acceleration sensor according to the one embodiment of the present invention.
Figure 13:
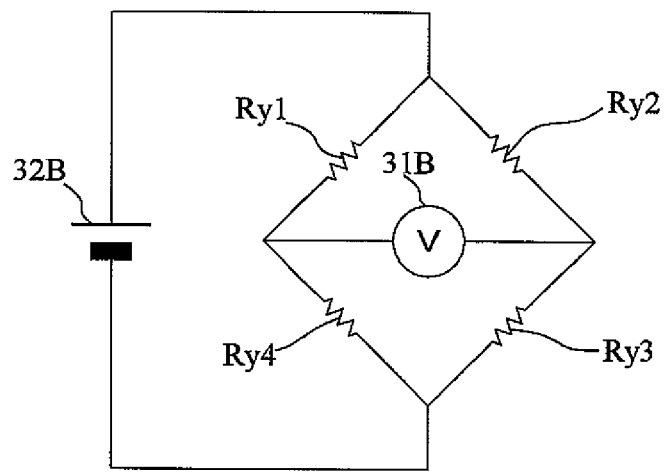
FIG. 13 is a view showing a bridge circuit sensing an acceleration in a Y axis direction using the semiconductor acceleration sensor according to the one embodiment of the present invention.
Figure 14:
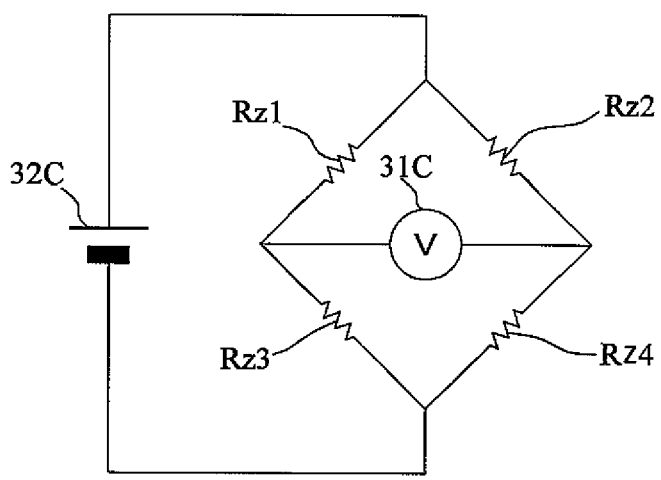
FIG. 14 is a view showing a bridge circuit sensing an acceleration in a Z axis direction using the semiconductor acceleration sensor according to the one embodiment of the present invention.

When the semiconductor acceleration sensor 10 having the above configuration is used, three resister bridge circuits are constructed as shown in FIGS. 12 to 14. More specifically, in a bridge circuit for sensing an acceleration in a direction of the X axis, as shown in FIG. 12, the positive electrode of a direct current power source 32A is connected to a connection point between one end of a piezo resistor Rx1 and one end of a piezo resistor Rx2, and the negative electrode of the direct current power source 32A is connected to a connection point between one end of a piezo resistor Rx3 and one end of a piezo resistor Rx4. Further, one end of a voltage sensing unit 31A is connected to a connection point between the other end of the piezo resistor Rx1 and the other end of the piezo resistor Rx4, and the other end of the voltage sensing unit 31A is connected to a connection point between the other end of the piezo resistor Rx2 and the other end of the piezo resistor Rx3.

Also, in a bridge circuit for sensing an acceleration in a direction of the Y axis, as shown in FIG. 13, the positive electrode of a direct current power source 32B is connected to a connection point between one end of a piezo resistor Ry1 and one end of a piezo resistor Ry2, and the negative electrode of the direct current power source 32B is connected to a connection point between one end of a piezo resistor Ry3 and one end of a piezo resistor Ry4. Further, one end of a voltage sensing unit 31B is connected to a connection point between the other end of the piezo resistor Ry1 and the other end of the piezo resistor Ry4, and the other end of the voltage sensing unit 31B is connected to a connection point between the other end of the piezo resistor Ry2 and the other end of the piezo resistor Ry3.

In a bridge circuit for sensing an acceleration in a direction of the Z axis, as shown in FIG. 14, the positive electrode of a direct current power source 32C is connected to a connection point between one end of a piezo resistor Rz1 and one end of a piezo resistor Rz2, and the negative electrode of the direct current power source 32C is connected to a connection point between one end of a piezo resistor Rz3 and one end of a piezo resistor Rz4. Further, one end of a voltage sensing unit 31C is connected to a connection point between the other end of the piezo resistor Rz1 and the other end of the piezo resistor Rz3, and the other end of the voltage sensing unit 31C is connected to a connection point between the other end of the piezo resistor Rz2 and the other end of the piezo resistor Rz4.

With the semiconductor acceleration sensor 10 having the above configuration, when force generated in association with acceleration applied to the sensor 10 is exerted on the plumb bob 15, distortion occurs in each of the diaphragm pieces 13a to 13d, whereby the resistance value of the piezo resistors Rx1 to Rx4, Ry1 to Ry4 and Rz1 to Rz4 changes. Accordingly, by forming the resistor bridge circuit with the piezo resistors Rx1 to Rx4, Ry1 to Ry4 and Rz1 to Rz4 disposed in each of the diaphragm pieces 13a to 13d, accelerations in the directions of the X axis, Y axis and Z axis orthogonal to each other can be sensed.

Figure 15:
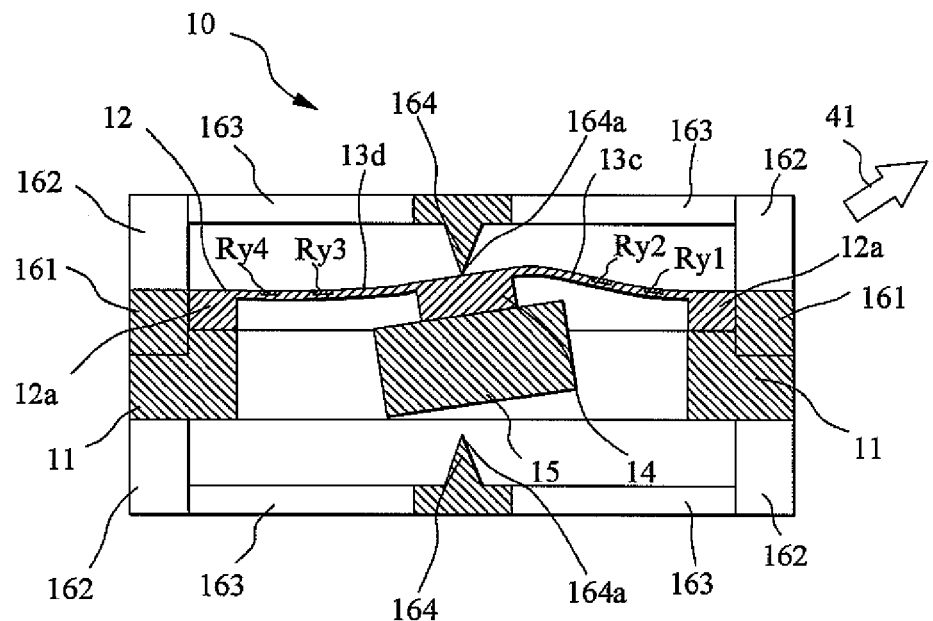
FIG. 15 is a view for explaining the operation of the semiconductor acceleration sensor according to the one embodiment of the present invention.
Figure 16:
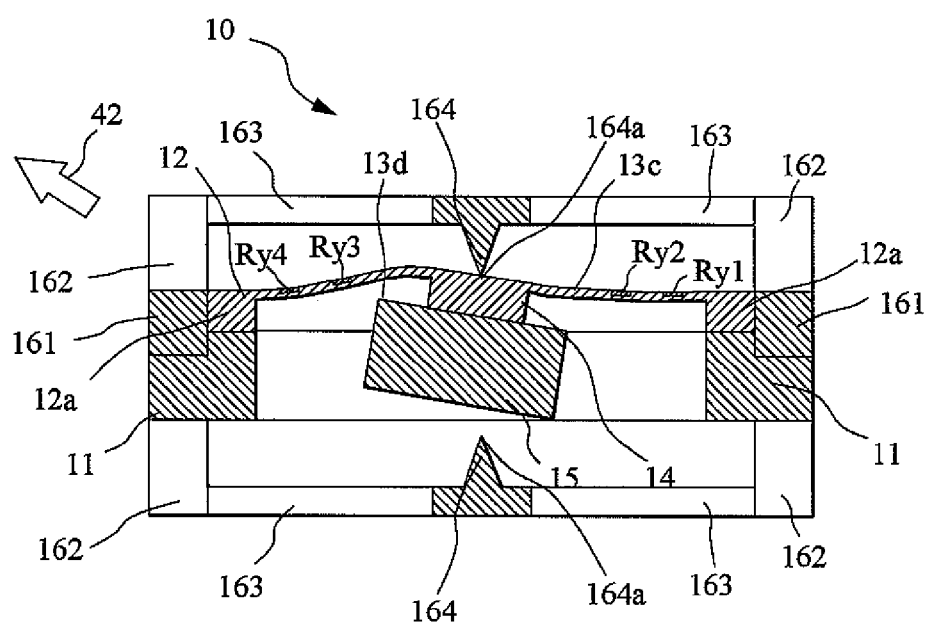
FIG. 16 is a view for explaining the operation of the semiconductor acceleration sensor according to the one embodiment of the present invention.

Further, as shown in FIGS. 15 and 16, in a case where there is applied an acceleration such that force 41 or 42 including a force component in a direction orthogonal to the face of the diaphragm 13 is exerted, when force of a predetermined value or more is exerted on the other face side of the diaphragm 13, the diaphragm 13 is distorted and stretched in a direction of the force 41 or 42 being exerted. However, the displacement is limited by being supported by the apex 184a of the protrusion section 184, so each of the diaphragm pieces 13a to 13d cannot be stretched to a maximum. Accordingly, even when force of a predetermined value or more is exerted on the other face side of the diaphragm 13, also, the position of the plumb bob 15 changes with the apex 184a of the protrusion section 184 working as the supporting point, so an acceleration in a direction parallel to the face of the diaphragm 13 can be sensed.

With the above described semiconductor acceleration sensor 10, as shown in FIG. 2, when the vehicle is running, accelerations generated in the directions of the X axis, Y axis and Z axis orthogonal to each other in each of the four tires 2 of the vehicle can be sensed. Also, the grip of the tire 2 can be estimated from the acceleration in a direction of the Z axis.

Figure 17:
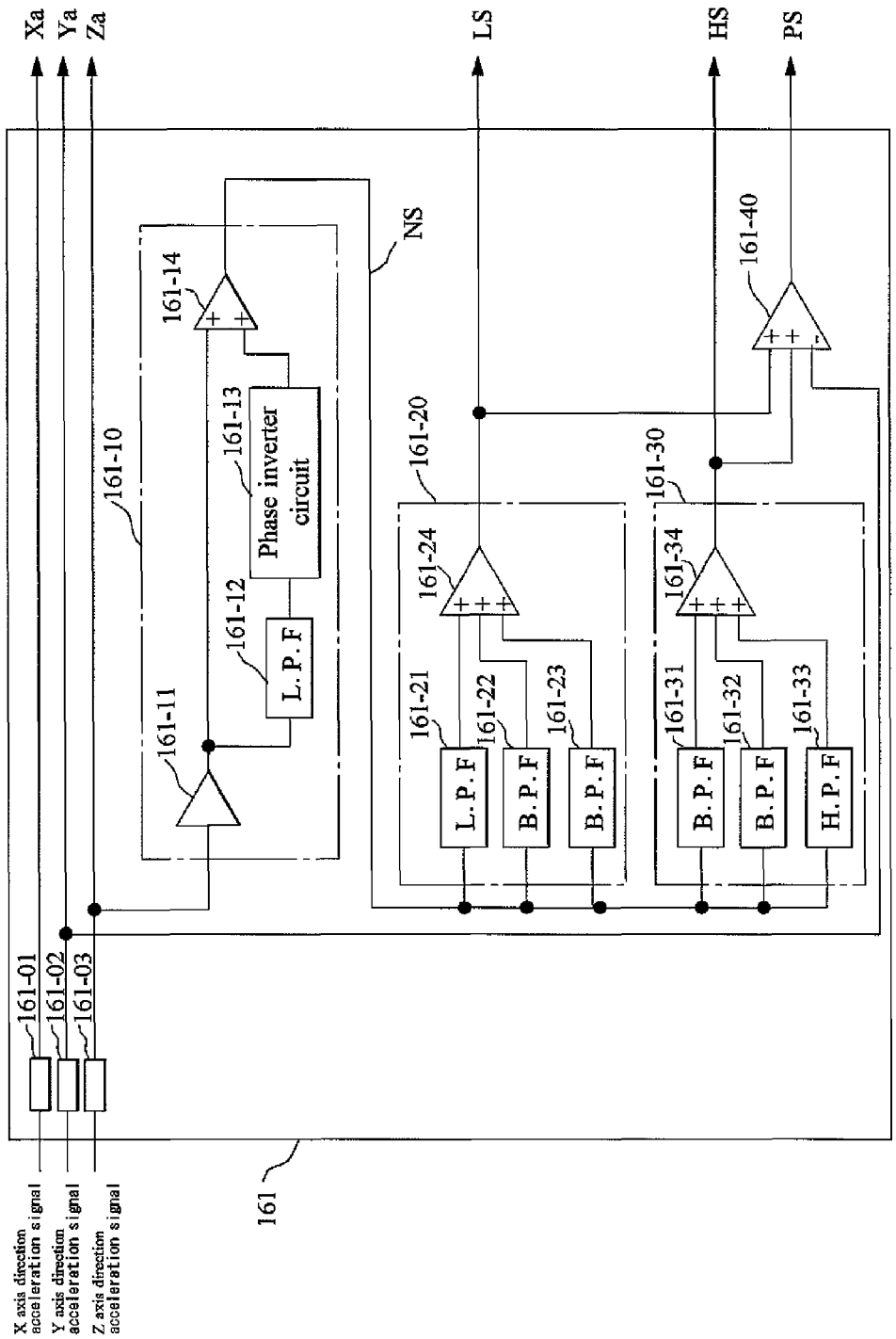
FIG. 17 is a configuration diagram showing a signal processing circuit according to the one embodiment of the present invention.

The signal processing circuit 161 as shown in FIG. 17 is constituted of voltage generation circuits 161-01 to 161-03, a basic wave elimination circuit 161-10, a first separation circuit 161-20, a second separation circuit 161-30 and an arithmetic circuit 161-40.

The voltage generation circuits 161-01 to 161-03 are constituted of a bridge circuit as described above having connected therein piezo resistors of the acceleration sensor 10. The voltage generation circuits 161-01 has connected therein piezo resistors for sensing an acceleration in a direction of the X axis and outputs signal voltage Xa corresponding to the acceleration in a direction of the X axis. The voltage generation circuits 161-02 has connected therein piezo resistors for sensing an acceleration in a direction of the Y axis and outputs signal voltage Ya corresponding to the acceleration in a direction of the Y axis. The voltage generation circuits 161-03 has connected therein piezo resistors for sensing an acceleration in a direction of the Z axis and outputs a signal voltage Ya corresponding to the acceleration in a direction of the Z axis.

The basic wave elimination circuit 161-10 is constituted of an amplifier circuit 161-11, a low-pass filter (L.P.F) 161-12, a phase inverter circuit 161-13 and an arithmetic circuit 161-14.

The amplifier 161-11 receives Z axis direction acceleration signal voltage Za, amplifies this and outputs it to the low-pass filter 161-12 and the arithmetic circuit 161-14.

The low-pass filter 161-12 is constituted of a known active filter and its cutoff frequency is set, for example to 200 Hz, allowing passage of only a signal component of 200 Hz or less.

The phase inverter circuit 161-13 inverts by 180 degrees the phase of a voltage signal outputted from the low-pass filter 161-12 and performs outputting.

The arithmetic circuit 161-14 receives an output signal from the amplifier circuit 161-11 and an output signal from the phase inverter circuit 161-13 and outputs a signal obtained by adding these two signals as ground contact pattern determination signal NS.

The first separation circuit 161-20 is a circuit extracting a signal of a frequency equal to or less than a predetermined frequency from the ground contact pattern determination signal NS, and constituted of a low-pass filter 161-21, band-pass filters (B.P.F.) 161-22 and 161-23, and an arithmetic circuit 161-24.

The low-pass filter 161-21 which is constituted of a known active filter and whose cutoff frequency is set, for example to 50 Hz, receives the ground contact pattern determination signal NS, allowing passage of only a signal component of 50 Hz or less.

The band-pass filter 161-22 is constituted of a known active filter and receives the ground contact pattern determination signal NS and allows passage of a signal of a frequency between 50 Hz to 200 Hz.

The band-pass filter 161-23 is constituted of a known active filter and receives the ground contact pattern determination signal NS and allows passage of a signal of a frequency between 200 Hz to 400 Hz.

The arithmetic circuit 161-24 receives three signals outputted, respectively, from the low-pass filter 161-21 and band-pass filters (B.P.F.) 161-22 and 161-23 and outputs a signal LS obtained by adding (combining) these three signals.

The reason why the first separation circuit 161-20 includes the low-pass filter 161-21 and band-pass filter 161-22 is as follows. That is, when a gravity acceleration component is eliminated in the basic wave elimination circuit 161-10, it is expected that any noise component of 200 Hz or less is also eliminated. However, the cutoff frequency characteristic of the low-pass filter 161-12 has a slope. Therefore, a noise component of 200 Hz or less is also outputted from the basic wave elimination circuit 161-10.

The second separation circuit 161-30 is a circuit extracting a signal of a higher frequency equal to or higher than a predetermined frequency from the ground contact pattern determination signal NS, and constituted of band-pass filters (B.P.F.) 161-31 and 161-32, a high-pass filter 161-33 and an arithmetic circuit 161-34.

The band-pass filter 161-31 is constituted of a known active filter and receives the ground contact pattern determination signal NS and allows passage of a signal of a frequency between 600 Hz to 1000 Hz.

The band-pass filter 161-32 is constituted of a known active filter and receives the ground contact pattern determination signal NS and allows passage of a signal of a frequency between 1000 Hz to 1500 Hz.

The high-pass filter 161-33 which is constituted of a known active filter and whose cutoff frequency is set, for example to 1500 Hz, receives the ground contact pattern determination signal NS, allowing passage of only a signal component of 1500 Hz or more.

The arithmetic circuit 161-34 receives three signals outputted, respectively, from the band-pass filters (B.P.F.) 161-

31 and 161-32 and the high-pass filter 161-33 and outputs a signal HS obtained by adding (combining) these three signals.

The arithmetic circuit 161-40 adds the signal LS outputted from the first separation circuit 161-20 and the signal HS outputted from the second separation circuit 161-30 and at the same time, outputs a combination signal PS obtained by subtracting the Y axis acceleration signal Ya from this addition signal.

As described above, the signal processing circuit 161 outputs to the A/D converter circuit 162, six signals, i.e., the X axis direction acceleration signal Xa, the Y axis direction acceleration signal Ya, the Z axis direction acceleration signal Za, the low frequency component signal LS of the ground contact pattern determination signal NS, the high frequency component signal HS of the ground contact pattern determination signal NS, and the combination signal PS.

The reason why the first separation circuit 161-20 and the second separation circuit 161-30 each have, as described above, plural filters connected in parallel is to reduce phase shifting of a passing signal. More specifically, when only one filter is used, its pass frequency bandwidth is broad, so a large difference in transmittance phase can occur between the lower frequency signal and higher frequency signal in the pass frequency band. However, when plural filters each having a narrower pass frequency bandwidth is provided, as with the present embodiment, to achieve a broader pass frequency bandwidth as a whole, it is possible to minimize phase shifting ascribable to a difference in passing signal frequency between the respective filters and further, and also to minimize signal phase shifting as a whole.

According to the present embodiment, in each of the first separation circuit 161-20 extracting the low frequency component from the ground contact pattern determination signal NS and the second separation circuit 161-30 extracting the high frequency component from the ground contact pattern determination signal NS, there are included three filters. However, the present invention is not limited thereto; as the number of filters increases, phase shifting of a passing signal can be reduced, so it is preferred that this number is appropriately set to two or more.

Also, according to the present embodiment, each filter is constituted of an active filter, but the present invention is not limited thereto. However, compared to typical LC type filter, active filter has a smaller signal delay time constant and has no electrical charge accumulated therein. Therefore, it is suitable for the signal high-speed real time processing as in the present embodiment.

The A/D converter section 162 converts each of the six analog electrical signal outputted from the signal processing circuit 161 into a digital signal and outputs the digital signal to the CPU 141.

Accordingly, from the sensor unit 100, there are transmitted to the monitor device 200 the X axis direction acceleration signal Xa, the Y axis direction acceleration signal Ya, the Z axis direction acceleration signal Za, the low frequency component signal LS of the ground contact pattern determination signal NS, the high frequency component signal HS of the ground contact pattern determination signal NS, and the combination signal PS as digital information.

As the acceleration generated in each of the directions of the X axis, Y axis and Z axis, there are positive direction acceleration and negative direction acceleration. In the present embodiment, both accelerations can be sensed.

Also, according to the present embodiment, as described above, a frequency of 2.45 GHz band is used as the first and second frequencies. Thus, susceptibleness to effects of metal is reduced. In order to reduce susceptibleness to effects of metal, a frequency of 1 GHz or more is preferably used as the first and second frequencies.

The monitor device 200 is connected to the stability control unit 700 via a cable and is operated by electric energy sent from the stability control unit 700.

Figure 18:
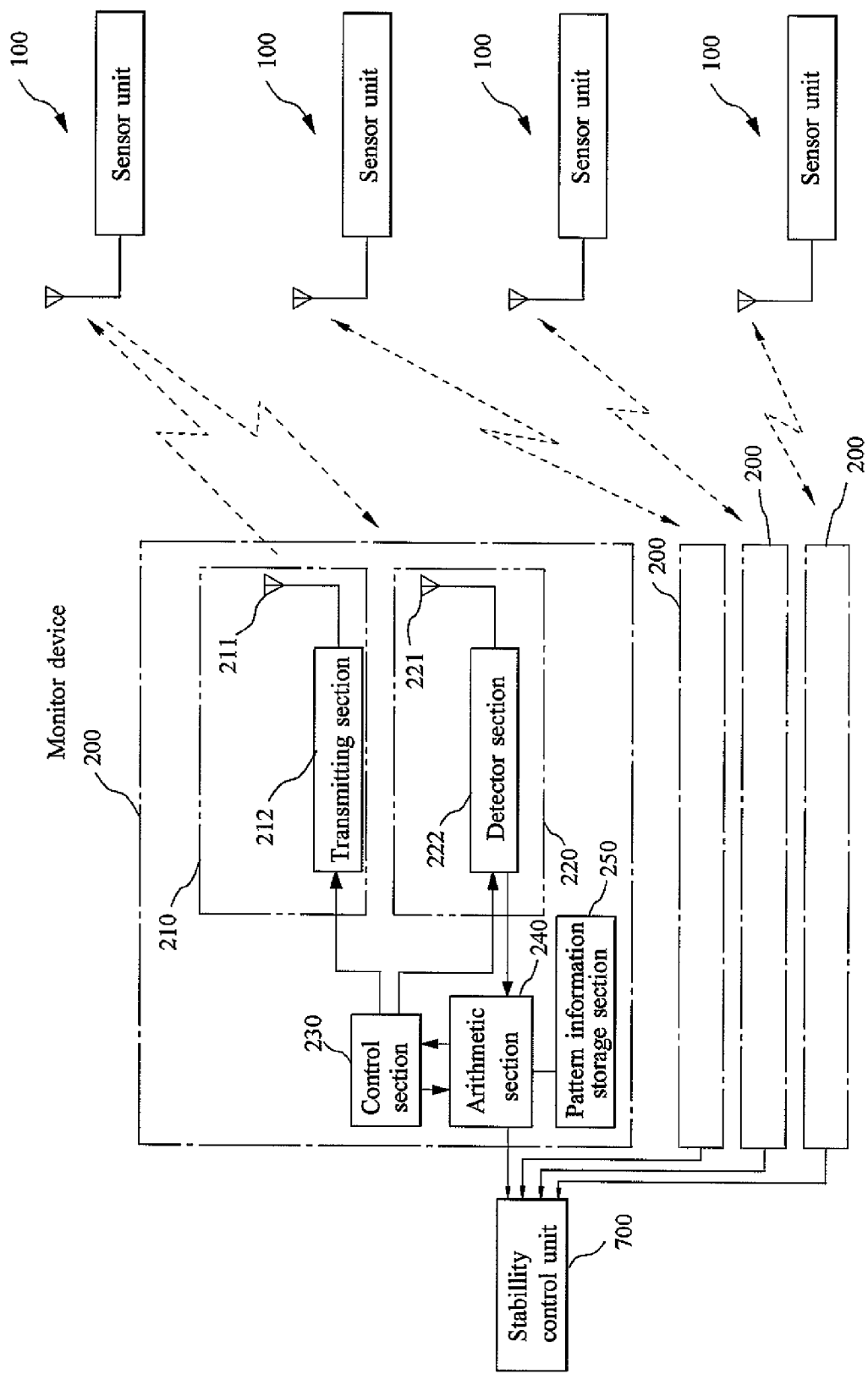
FIG. 18 is a configuration diagram showing an electrical circuit of the monitor device according to the one embodiment of the present invention.

As shown in FIG. 18, the electrical circuit of the monitor device 200 is constituted of a memory circuit including a radiation unit (power supplying section) 210, a receiving unit 220, a control section 230, an arithmetic section 240 and a pattern information storage section 250. Here, the control section 230 and the arithmetic section 240 are each constituted of a known CPU, an ROM having stored therein a program causing this CPU to operate, and an RAM required to perform an arithmetic processing.

The radiation unit 210 is constituted of an antenna 211 for radiating a radio wave of a predetermined frequency of 2.45 GHz band (the above first frequency) and a transmitting section 212 and radiates a radio wave of the above first frequency via the antenna 211 based on an instruction from the control section 230.

Examples of the transmitting section 212 include a configuration composed of the oscillator circuit 151, modulator circuit 152 and high frequency amplifier circuit 153 similarly to the transmitting section 150 of the sensor unit 100. Accordingly, a radio wave of 2.45 GHz is radiated from the antenna 211. The high frequency power outputted from the transmitting section 212 is set approximately to a value which makes it possible to supply electric energy from the antenna 211 of the monitor device 200 for radiating a radio wave to the sensor unit 100.

The receiver unit 220 is constituted of an antenna 221 for receiving a radio wave of a predetermined frequency (the second frequency) of 2.45 GHz band and a detector section 222, and detects the radio wave of the second frequency received by the antenna 221 based on an instruction from the control section 230 and converts a signal obtained by detecting the radio wave into a digital signal and outputs the digital signal to the arithmetic section 250. Examples of the detector section 222 include a circuit constituted of a diode and an analog/digital converter etc. converting a signal being the result of being detected by this diode into digital data.

When electric energy is supplied from the stability control unit 700 to initiate the operation of the control section 230, the control section 230 drives the detector section 222 at all times so that the digital signal is outputted from the detector section 222 to the arithmetic section 240.

The arithmetic section 240 calculates the above acceleration based on the digital signal outputted from the detector section 222 and outputs it to the stability control unit 700 and at the same time, compares the information stored in the pattern information storage section 250 and the ground contact pattern information outputted from the detector section 222 to specify a ground contact pattern of each tire 2 and outputs the resultant information to the stability control unit 700.

The pattern information storage section 250 includes, for example, an information storage element such as ROM. In this information storage element, there are preliminarily stored the above described the low frequency component signal LS of the ground contact pattern determination signal NS, the high frequency component signal HS of the ground contact pattern determination signal NS, the combination signal PS and the ground contact pattern information of the tire 2, which are associated with each other. This associating is based on the result etc. of an experiment preliminarily performed. Also, the ground contact pattern information includes at least information on tire ground contact area, information on tire ground contact region, and so on with respect to running road surface.

Figure 19:
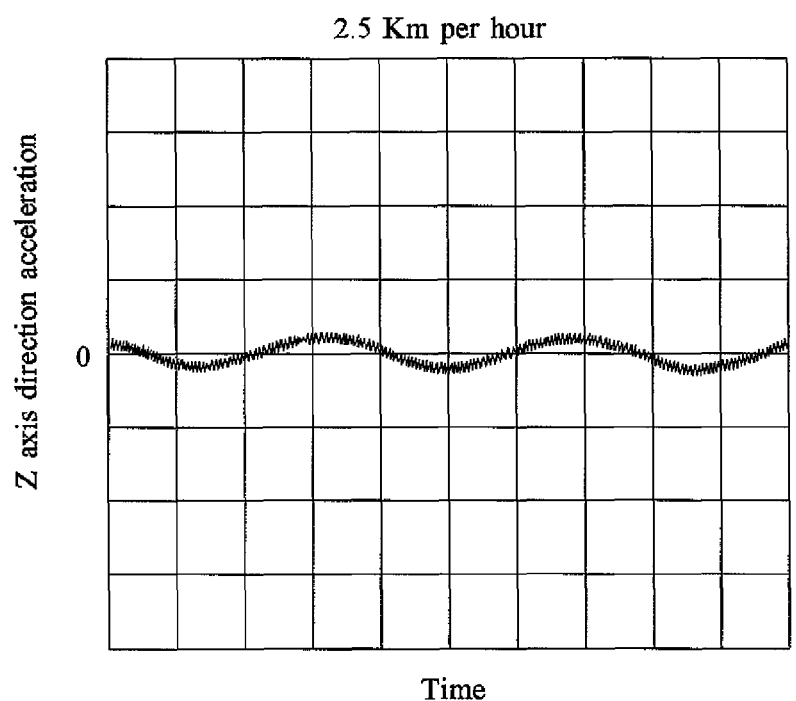
FIG. 19 is a view showing the measurement result of acceleration in a Z axis direction according to the one embodiment of the present invention.
Figure 20:
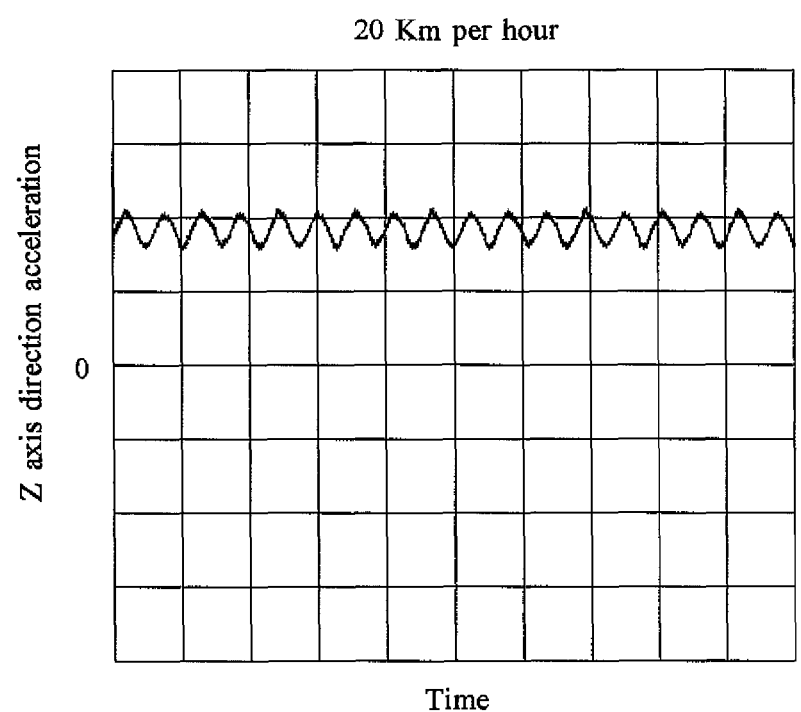
FIG. 20 is a view showing the measurement result of acceleration in a Z axis direction according to the one embodiment of the present invention.
Figure 21:
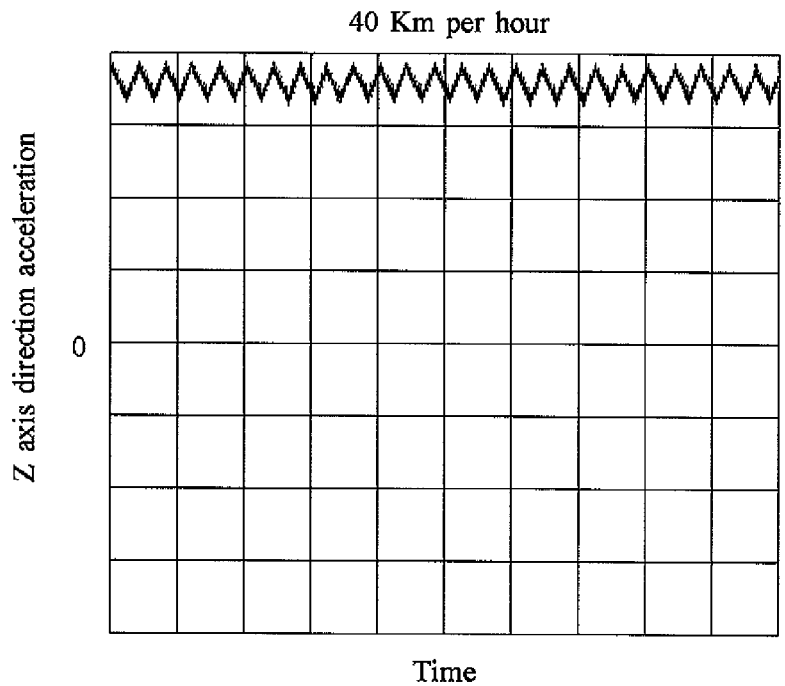
FIG. 21 is a view showing the measurement result of acceleration in a Z axis direction according to the one embodiment of the present invention.
Figure 22:
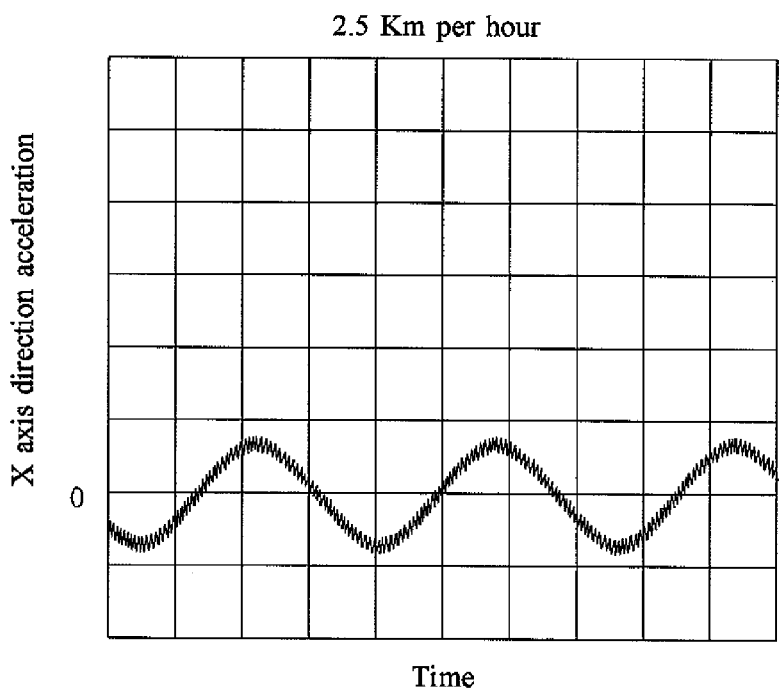
FIG. 22 is a view showing the measurement result of acceleration in an X axis direction according to the one embodiment of the present invention.
Figure 23:
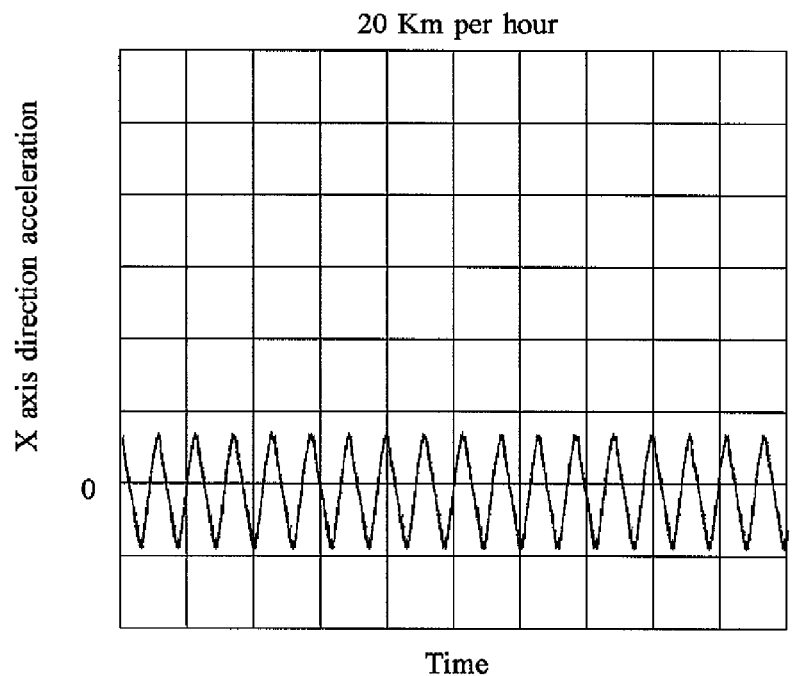
FIG. 23 is a view showing the measurement result of acceleration in an X axis direction according to the one embodiment of the present invention.
Figure 24:
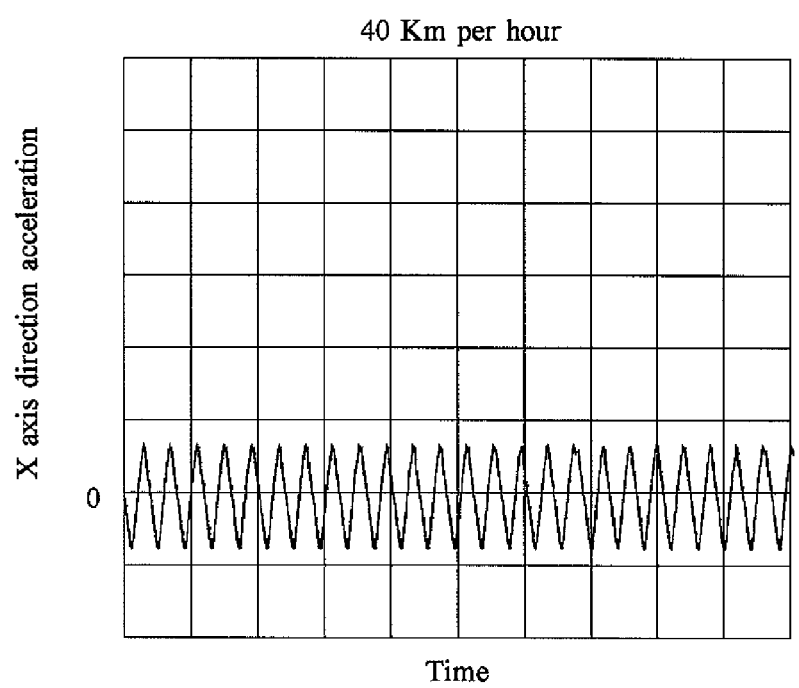
FIG. 24 is a view showing the measurement result of acceleration in an X axis direction according to the one embodiment of the present invention.
Figure 25:
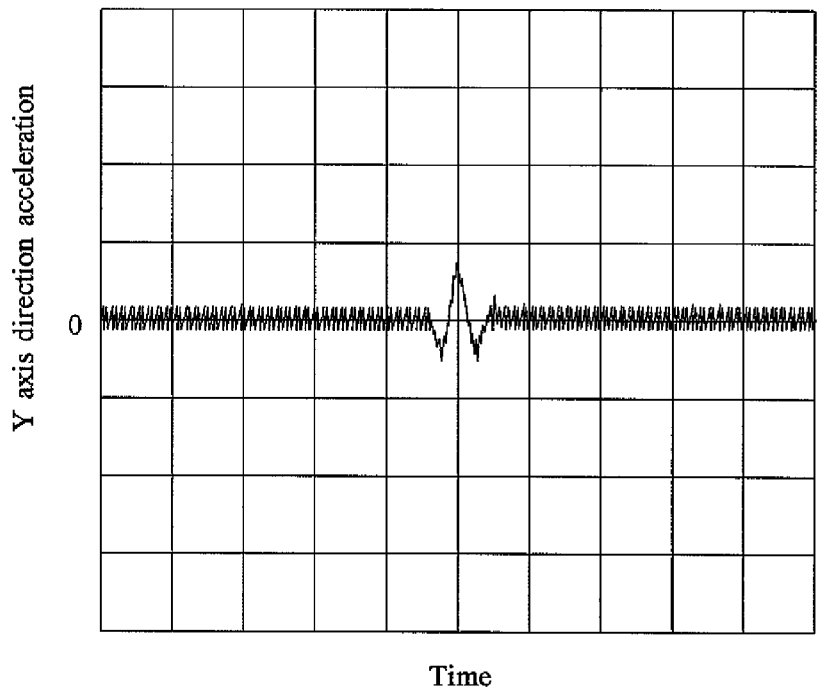
FIG. 25 is a view showing the measurement result of acceleration in a Y axis direction according to the one embodiment of the present invention.
Figure 26:
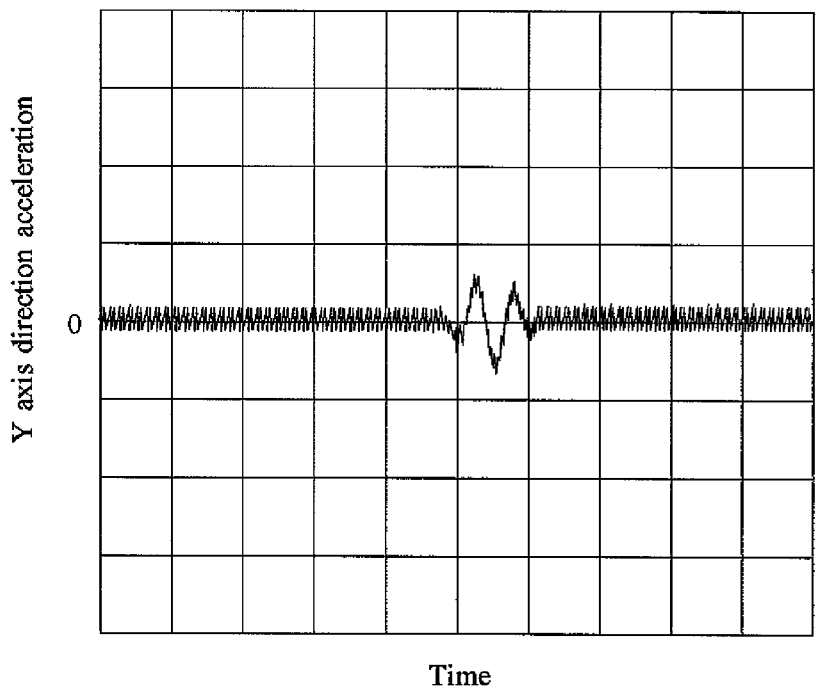
FIG. 26 is a view showing the measurement result of acceleration in a Y axis direction according to the one embodiment of the present invention.
Figure 27:
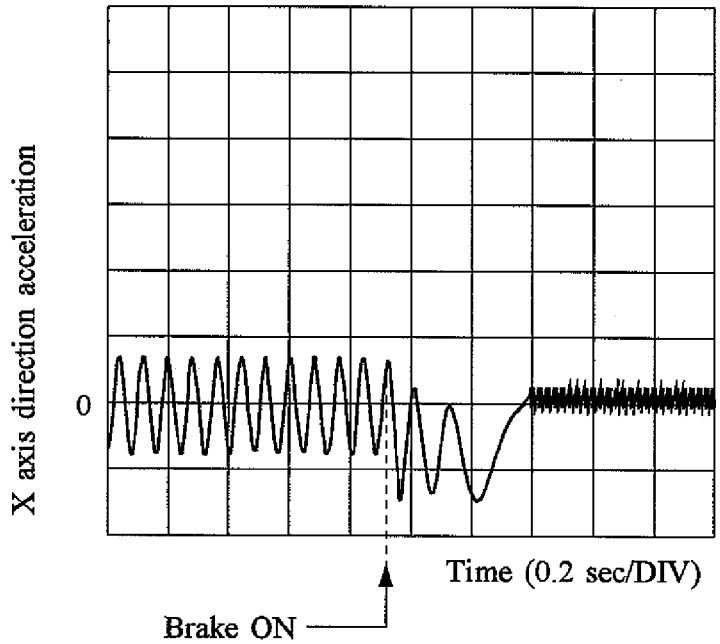
FIG. 27 is a view showing the measurement result of acceleration in an X axis direction at the time of applying the brake according to the one embodiment of the present invention.
Figure 28:
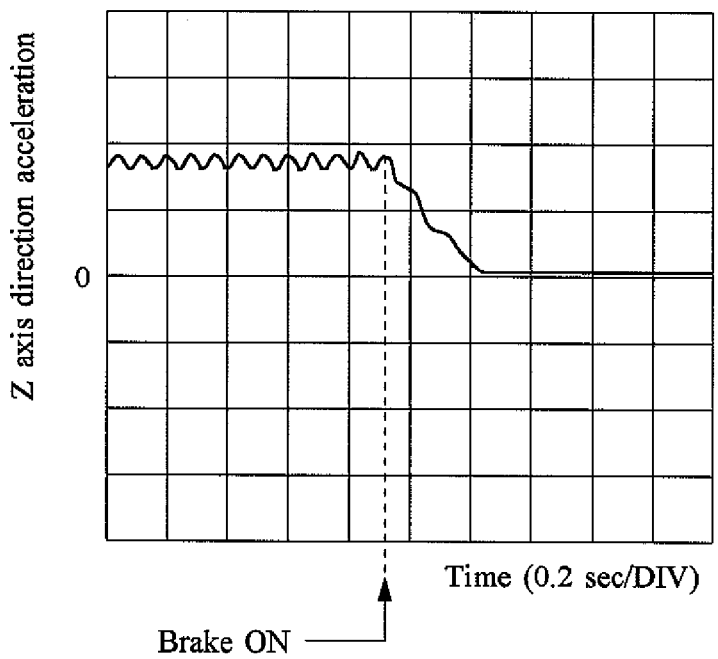
FIG. 28 is a view showing the measurement result of acceleration in a Z axis direction at the time of applying the brake according to the one embodiment of the present invention.

The operation of the system having the above described configuration will now be described with reference to the drawings. FIGS. 19 to 21 each show the measurement result of acceleration in a Z axis direction; FIGS. 22 to 24 each show the measurement result of acceleration in an X axis direction; FIGS. 25 and 26 each show the measurement result of acceleration in a Y axis direction; FIG. 27 shows the measurement result of acceleration in an X axis direction at the time of applying the brake; FIG. 28 shows the measurement result of acceleration in a Z axis direction at the time of applying the brake.

Referring to FIGS. 19 to 21, FIG. 19 shows the measurement value of acceleration in a Z axis direction when the vehicle is running at a speed of 2.5 km per hour; FIG. 20 shows the measurement value of acceleration in a Z axis direction when the vehicle is running at a speed of 20 km per hour; FIG. 21 shows the measurement value of acceleration in a Z axis direction when the vehicle is running at a speed of 40 km per hour. In this manner, as the running speed increases, centrifugal force becomes larger, so the acceleration in a Z axis direction also becomes larger. Accordingly, the running speed can be determined from the acceleration in a Z axis direction.

In the drawings, the measurement value has a sinusoidal waveform because of being affected by gravity acceleration. More specifically, when the sensor unit 100 is positioned at the uppermost part of the tire 2, the acceleration in a Z axis direction is obtained by subtracting gravity from centrifugal force; when the sensor unit 100 is positioned at the lowermost part of the tire 2, the acceleration in a Z axis direction is obtained by adding gravity to centrifugal force.

According to the present embodiment, since a radio wave is radiated from the radiation unit 210, a voltage of 3 V or more used as electric energy sufficient to drive the sensor unit 100 at all times can be accumulated in the capacitor 133.

Referring to FIGS. 22 to 24, FIG. 22 shows the measurement value of acceleration in an X axis direction when the vehicle is running at a speed of 2.5 km per hour; FIG. 23 shows the measurement value of acceleration in an X axis direction when the vehicle is running at a speed of 20 km per hour; FIG. 24 shows the measurement value of acceleration in an X axis direction when the vehicle is running at a speed of 40 km per hour. In this manner, as the running speed increases, the number of wheel rotations becomes larger, so the cycle of fluctuation of the X axis direction acceleration becomes shorter. Accordingly, the number of wheel rotations can be determined from the acceleration in an X axis direction. In the drawings, the measurement value has a sinusoidal waveform because of being affected by gravity acceleration similarly to the above described measurement value.

FIG. 25 shows the measurement value of acceleration in a Y axis direction when the steering wheel is turned to the right during running of the vehicle. FIG. 26 shows the measurement value of acceleration in a Y axis direction when the steering wheel is turned to the left during running of the vehicle. In this manner, when the steering wheel is turned to swing the tire 2 (wheel) to the right or left, the acceleration in a Y axis direction emerges noticeably. Also, it will easily be appreciated that when the vehicle body skids, also, the acceleration in a Y axis direction emerges similarly. In each of the above measurement values in a Y axis direction, acceleration in a reverse direction is observed because the driver turns slightly the steering wheel in a reverse direction unconsciously.

Also, as shown in FIGS. 27 and 28, it can be accurately sensed that the time period from when the brake is applied (brake ON: when the brake pedal is pushed down) to when the rotation of tire 2 (wheel) stops is about 0.2 seconds.

When the acceleration generated when the brake pedal 610 is pushed down is sensed, the amount of distortion of tire 2, skid of vehicle body, wheelspin and the like can be estimated, and based on these, the pressure control valve can be controlled when the vehicle is braked.

Consequently, according to the above described vehicle drive control system, during running of a vehicle, accelerations generated in the directions of the X axis, Y axis and Z axis orthogonal to each other in each of the four tires 2 of the vehicle can be sensed.

Figure 29:
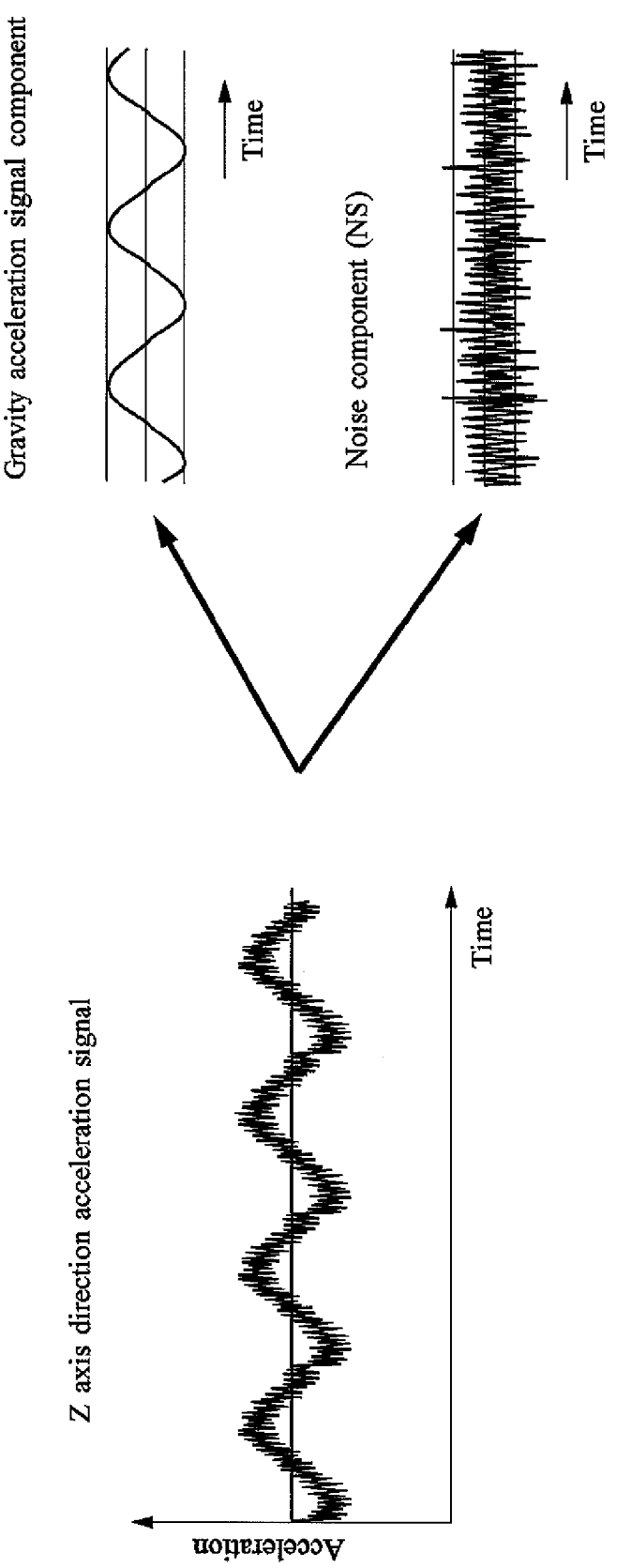
FIG. 29 is a view for explaining the operation of a basic waveform elimination circuit according to the one embodiment of the present invention.

Further, according to the present embodiment, a gravity acceleration signal component of a Z axis direction acceleration signal is eliminated, as shown in FIG. 29, by the basic wave elimination circuit 161-10 of the signal processing circuit 161 to extract a noise component of the Z axis direction acceleration signal. Accordingly, a tire ground contact pattern can be accurately sensed from this noise component. That is, this noise component varies according to tire ground contact pattern.

Figure 30:
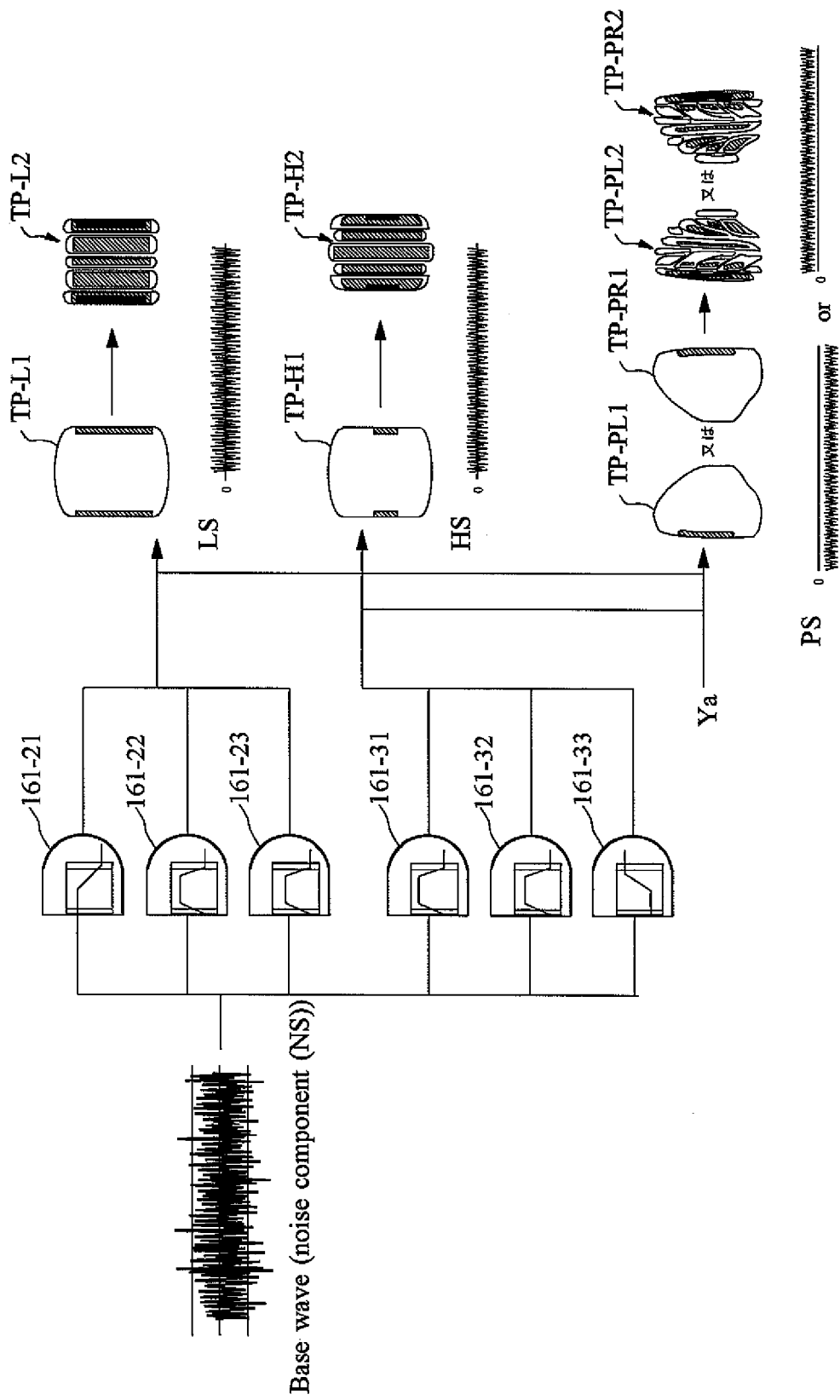
FIG. 30 is a view for explaining a tire ground contact pattern specifying method according to the one embodiment of the present invention.

According to the present embodiment, in specifying a tire ground contact pattern, for example as shown in FIG. 30, there are used the above described low frequency component signal LS of the ground contact pattern determination signal NS, the high frequency component signal HS of the ground contact pattern determination signal NS, and the combination signal PS.

For example, when the contact area between the tire and running road surface is large as in low speed running, as indicated by tire ground contact patterns TP-L1 and TP-L2, the contact area between the running road surface and the both edge parts of tire tread having a large contact pressure between the tire and the running road surface is large. Consequently, the low frequency noise component becomes large. Also, when the contact area between the tire and running road surface is small as in high speed running, as indicated by tire ground contact patterns TP-H1 and TP-H2, the contact area between the running road surface and the both edge parts of tire tread having a large contact pressure between the tire and the running road surface is small. Consequently, the high frequency noise component becomes large. Further, when the running vehicle performs cornering or the like to produce a lateral acceleration (Y axis direction acceleration), as indicated by tire ground contact patterns TP-PL1, TP-PR1, TP-PL2 and TP-PR2, polarization in the ground contact part of tire occurs and thus the part having a high contact pressure between the tire and the running road surface occurs in one of the left and right sides of tire tread.

These various tire ground contact patterns and information on low frequency component signal LS, high frequency component signal HS and combination signal PS are preliminarily determined by actual measurements and stored in the pattern information storage section 250. Accordingly, during running of a vehicle, based on the low frequency component signal LS of the ground contact pattern determination signal NS, the high frequency component signal HS of the ground contact pattern determination signal NS and the combination signal PS, ground contact patterns of each tire can be specified in real-time.

Also, in order to surely sense a noise component added to the acceleration signal, according to the present embodiment, as described above, the acceleration sensor is configured such that sensing can be performed in each of X axis, Y axis and Z axis directions up to an acceleration larger by a predetermined amount than a maximum acceleration generated by rotation of tire 2, e.g., up to an acceleration of ±3 nG when the maximum acceleration generated by rotation of tire 2 is ±nG (n being an integer).

As described above, a tire ground contact pattern can be determined from a Z axis direction acceleration and at the same time, based on information on each acceleration, grip or floating of tire 2 can be estimated. Thus, the amount of distortion of tire 2, skid of vehicle body, wheelspin and the like can be estimated, and based on these, the above described respective actuators can be controlled to stabilize running.

Figure 31:
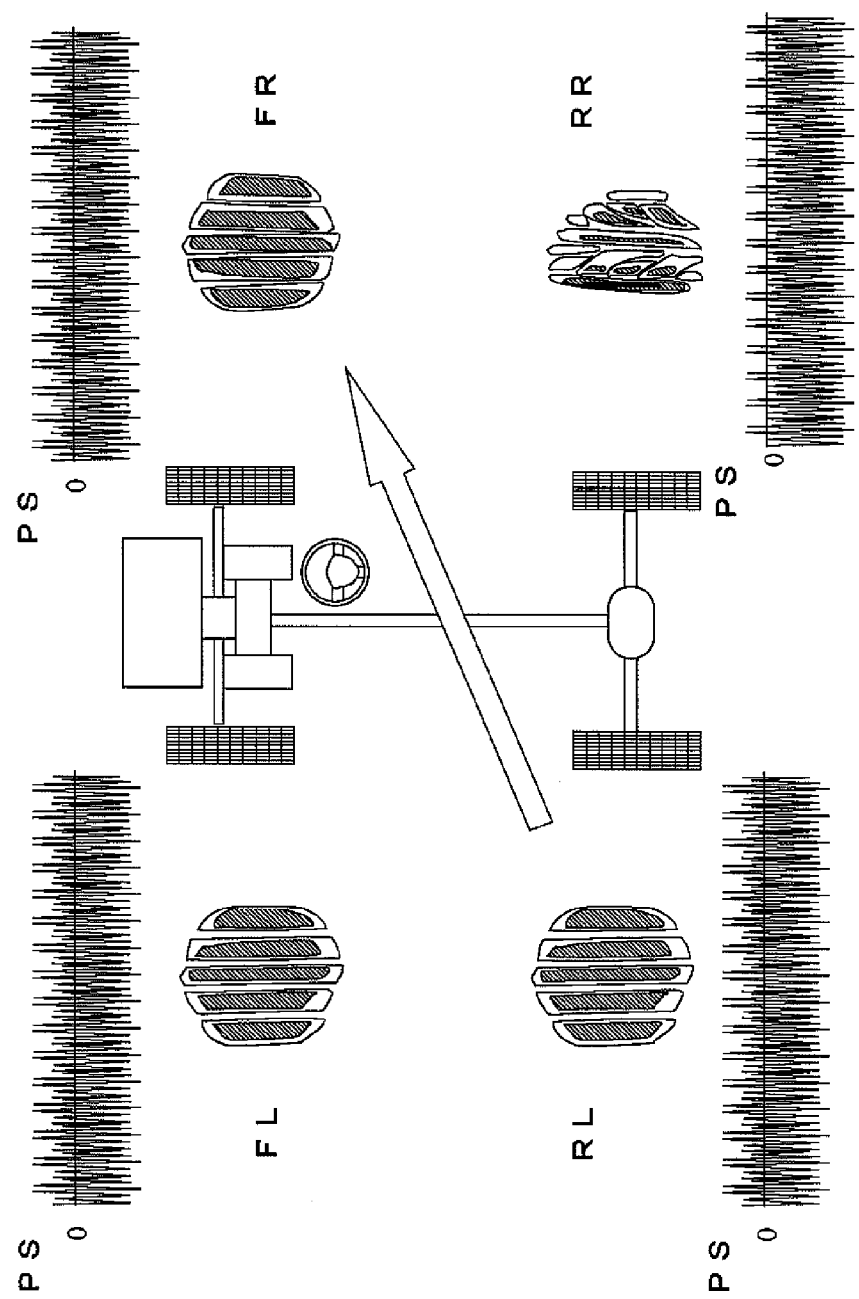
FIG. 31 is a view for explaining an example of stability control according to the one embodiment of the present invention.

For example, as shown in FIG. 31, in a case where a tire ground contact pattern is sensed in which a large right direction acceleration occurs in the right rear part (RR) tire and the ground contact area of the left edge part of tire tread increases and the ground contact area of the right edge part of tire tread decreases, if correction control by stability control is not performed, the vehicle does not go straight and curves; but if correction control is performed based on the above described sensing results, the vehicle can go straight stably.

According to the present embodiment, based on the Z axis direction acceleration, a tire ground contact pattern is determined. However, needless to say, a tire ground contact pattern may be determined based on a sensing result of X axis direction acceleration. Similarly to the Z axis direction acceleration, the X axis direction acceleration also includes a noise component varying according to the running road surface state. Therefore, when this noise component is extracted, a tire ground contact pattern can be determined.

Figure 32:
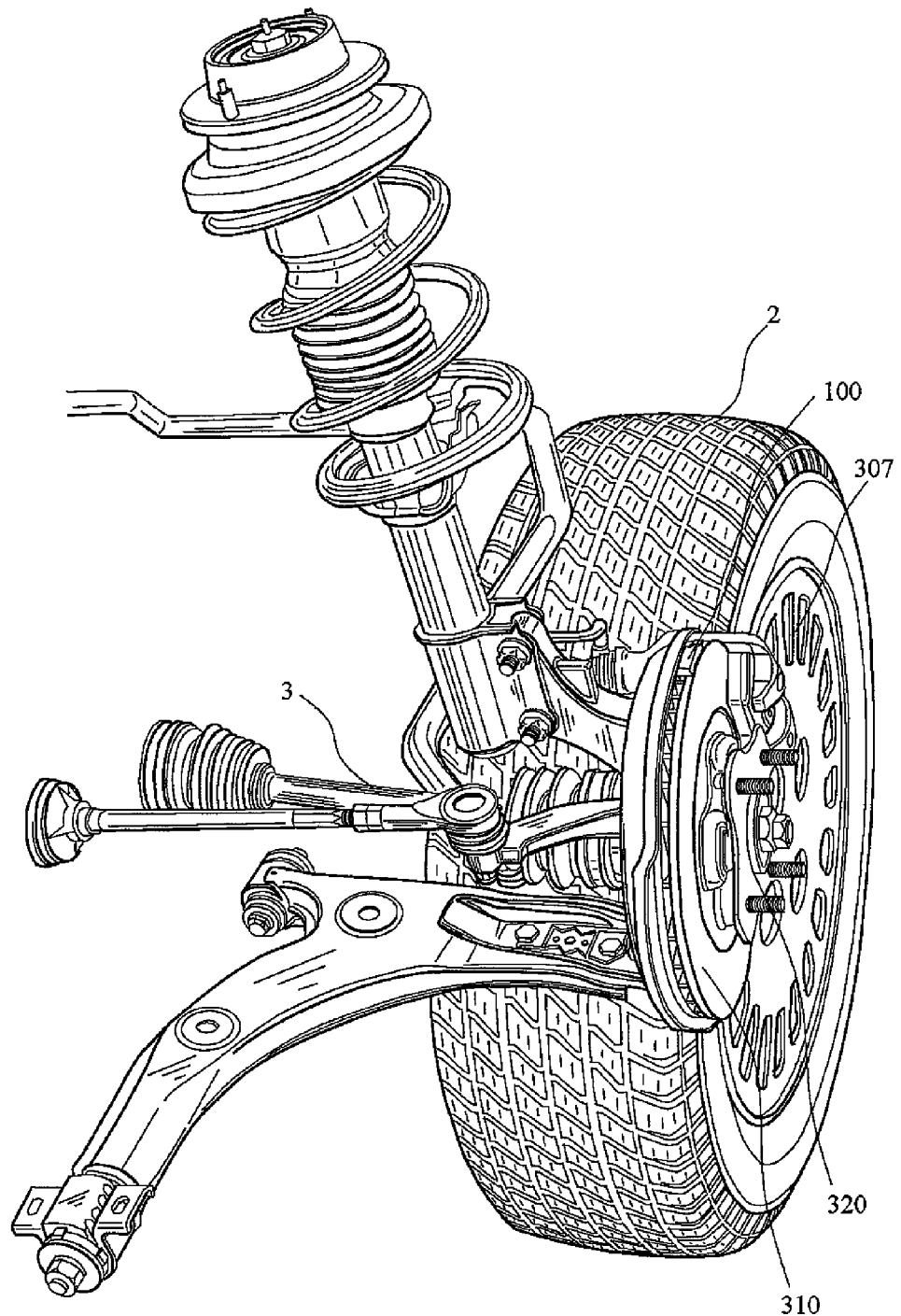
FIG. 32 is a view for explaining another mounting state of a rotation mechanism section and a sensor unit and others.

According to the present embodiment, the sensor unit 100 is secured to the rim 306 of the tire 2, but the location of placement of the sensor unit 100 is not limited to the rim 306; any rotating portion within the rotation mechanism section causing the tire 2 to rotate is possible. For example, as shown in FIG. 32, the rotation mechanism section includes a brake disk 310 rotating along with the axle 3, a wheel carrier 320 for holding the wheel of the tire 2, and rotating bodies of the tire 2 such as the tire main body 305 and the rim 306. Accordingly, if the sensor unit 100 is secured to the brake disk 310, the wheel carrier 320 or the like, even when the tire main body 305 is changed along with the wheel 307, the same sensor unit 100 can be used to constitute the system.

Also, according to the present embodiment, in the sensor unit 100, there are produced the low frequency component signal LS of ground contact pattern determination signal NS, the high frequency component signal HS of the ground contact pattern determination signal NS and the combination signal PS, and these are transmitted to the monitor device 200 along with acceleration signals in the directions of the X axis, Y axis and Z axis. However, the present invention is not limited thereto; for example, it is also possible that the sensor unit 100 transmits acceleration signals in the directions of the X axis, Y axis and Z axis, and in the monitor device 200, based on these, the low frequency component signal LS of the ground contact pattern determination signal NS, the high frequency component signal HS of the ground contact pattern determination signal NS and the combination signal PS are produced.

Also, according to the present embodiment, in the sensor unit 100, there are sensed accelerations in the directions of the X axis, Y axis and Z axis, and these are transmitted to the monitor device 200. However, if correction control is possible with only the low frequency component signal LS of the ground contact pattern determination signal NS, the high frequency component signal HS of the ground contact pattern determination signal NS and the combination signal PS, it is unnecessary to transmit acceleration information of X, Y and Z axis directions.

Also, according to the present embodiment, there is produced the signal PS obtained by combining the low frequency component signal LS of the ground contact pattern determination signal NS, the high frequency component signal HS of the ground contact pattern determination signal NS and the Y axis direction acceleration signal. However, a configuration may be employed such that the combination signal PS is not produced and a tire ground contact pattern is specified based on the low frequency component signal LS, the high frequency component signal HS and the Y axis direction acceleration signal. In this case, the low frequency component signal LS, high frequency component signal HS and Y axis direction acceleration signal are associated with the information on tire ground contact area and the information on tire ground contact region with respect to running road surface, and these are preliminarily stored in the pattern information storage section 250. Also, it is possible, to some extent, that a tire ground contact pattern is recognized by two signals, i.e., the low frequency component signal LS and high frequency component signal HS. In this case, the low frequency component signal LS and high frequency component signal HS are associated with the information on tire ground contact area and the information on tire ground contact region with respect to running road surface, and these are preliminarily stored in the pattern information storage section 250.

Also, according to the present embodiment, in addition to the low frequency component signal LS of the ground contact pattern determination signal NS, the high frequency component signal HS of the ground contact pattern determination signal NS and the combination signal PS, information on accelerations in the directions of the X axis, Y axis and Z axis generated in the tire 2 is transmitted from the sensor unit 100 to the monitor device 200. However, it is also possible that the sensor unit 100 includes a sensor sensing physical quantity other than accelerations varying according to the state of tire 2, e.g., physical quantity such as air pressure and temperature, and this sensing result is transmitted from the sensor unit 100 to monitor device 200.

Also, in the monitor device 200, one antenna may be shared as the transmitting antenna and receiving antenna.

Also, in the sensor unit 100, the transmitting antenna and receiving antenna may be individually provided.

INDUSTRIAL APPLICABILITY OF THE INVENTION

Proper control can be performed during running of the vehicle, thus improving stability during running. Also, tire distortion quantity, vehicle skid, wheelspin, tire grip and the like can be estimated from the accelerations. Accordingly, when these are used for vehicle brake control, the control can be performed with higher accuracy.

The invention claimed is:

1. A vehicle drive control system including a control unit for driving each of drive actuators for an engine throttle, steering and brake according to a result of sensing a vehicle driving operation state to perform stability control during running of a vehicle, the system characterized by comprising:
a plurality of sensor sections having an acceleration sensor, disposed in each rotation mechanism section including a rotation body positioned in the vehicle body side for securing a tire and allowing the tire to rotate and the tire, and sensing at least one of a first acceleration generated in association with rotation of the tire in a direction orthogonal to a rotation axis and a second acceleration generated in a direction of rotation, and converting the sensing result into an electrical signal and performing outputting;

a basic waveform elimination circuit configured to eliminate a gravity acceleration component from at least one electrical signal of the sensed first acceleration and second acceleration to generate a ground contact pattern determination signal of each tire, for each sensor section;

a separation circuit configured to separate a predetermined low frequency component and a predetermined high frequency component of the ground contact pattern determination signal;

a pattern information storage section configured to associate tire ground contact pattern information including at least information on tire ground contact area with respect to running road surface and the low frequency component and high frequency component, and preliminarily storing the resultant information;

an arithmetic section configured to specify a ground contact pattern of each tire with respect to running road surface based on the low frequency component and high frequency component obtained by the separation circuit and the information stored in the pattern information storage section and output this ground contact pattern information; and the control unit configured to correct the drive of a predetermined drive actuator from among the drive actuators based on the tire ground contact pattern of each tire outputted from the arithmetic section.

2. The vehicle drive control system according to claim 1, wherein the sensor section has the acceleration sensor configured to sense a third acceleration generated in a direction of the rotation axis and convert the sensing result into an electrical signal to output, the vehicle drive control system characterized by comprising:

the pattern information storage section configured to associate tire ground contact pattern information including at least information on tire ground contact area and information on tire ground contact region with respect to running road surface and the low frequency component and high frequency component and the third acceleration, and preliminarily storing the resultant information; and the arithmetic section configured to specify a tire ground contact pattern with respect to running road surface based on the low frequency component and high frequency component and the third acceleration and the information stored in the pattern information storage section and output this tire ground contact pattern information.

3. The vehicle drive control system according to claim 1, wherein the sensor section has the acceleration sensor configured to sense a third acceleration generated in a direction of the rotation axis and convert the sensing result into an electrical signal to output, the system characterized by comprising:

an arithmetic circuit configured to combine an electrical signal of the low frequency component and high frequency component and an electrical signal of the third acceleration and output an electrical signal obtained by combining these three signals;

the pattern information storage section configured to associate tire ground contact pattern information including at least information on tire ground contact area and information on tire ground contact region with respect to running road surface and the low frequency component and high frequency component and the combination signal, and preliminarily storing the resultant information; and the arithmetic section configured to specify a tire ground contact pattern with respect to running road surface based on the low frequency component and high frequency component and the combination signal obtained by the arithmetic circuit and the information stored in the pattern information storage section and output this tire ground contact pattern information.

4. The vehicle drive control system according to claim 1, characterized in that the sensor section senses accelerations in different directions at one given position.

5. The vehicle drive control system according to claim 1, characterized in that sensing can be performed by the acceleration sensor up to an acceleration larger by a predetermined amount than a maximum acceleration generated by rotation of the tire.

6. The vehicle drive control system according to claim 1, characterized in that, in order to separate the low frequency component of the ground contact pattern determination signal, the separation circuit comprises a first separation circuit including two or more low-pass filters or band-pass filters having a different pass band and configured to combine and output electrical signals outputted from each filter.

7. The vehicle drive control system according to claim 6, characterized in that the filter is an active type filter.

8. The vehicle drive control system according to claim 1, characterized in that, in order to separate the high frequency component of the ground contact pattern determination signal, the separation circuit comprises a second separation circuit including two or more high-pass filters or band-pass filters having a different pass band and configured to combine and output electrical signals outputted from each filter.

9. The vehicle drive control system according to claim 8, characterized in that the filter is an active type filter.

10. A sensor unit with an acceleration sensor disposed in a tire of a vehicle, sensing an acceleration generated in association with running of the vehicle, the unit characterized by comprising:

the acceleration sensor sensing at least one of a first acceleration generated in association with rotation of the tire in a direction orthogonal to a rotation axis and a second acceleration generated in a direction of rotation;

an A/D converter section configured to convert the sensing result of the acceleration sensor into an electrical signal and output thereof;

a basic waveform elimination circuit configured to eliminate a gravity acceleration component from at least one electrical signal of the sensed first acceleration and second acceleration to generate a ground contact pattern determination signal;

a separation circuit for separating a predetermined low frequency component and a predetermined high frequency component of the ground contact pattern determination signal;

the AD/converter section configured to convert the low frequency component and high frequency component separated by the separation circuit into a digital value; and a transmitting section configured to transmit digital information including the digital value.

11. The sensor unit according to claim 10, characterized by comprising:

the acceleration sensor configured to sense a third acceleration generated in a direction of the rotation axis the A/D converter section configured to convert the sensing result into a digital value; and the transmitting section configured to transmit the digital value of the third acceleration.

12. The sensor unit according to claim 10, characterized by comprising:

the acceleration sensor configured to sense a third acceleration generated in a direction of the rotation axis and convert the sensing result into an electrical signal to output;

an arithmetic circuit configured to combine an electrical signal of the low frequency component and high frequency component and an electrical signal of the third acceleration and output an electrical signal obtained by combining these three signals;

the A/D converter section configured to convert the combination signal obtained by the arithmetic circuit into a digital value; and a transmitting section configured to transmit the digital value of the combination signal.

13. The sensor unit according to claim 10, characterized in that the acceleration sensor senses accelerations in different directions at one given position.

14. The sensor unit according to claim 10, characterized in that sensing can be performed by the acceleration sensor up to an acceleration larger by a predetermined amount than a maximum acceleration generated by rotation of the tire.

15. The sensor unit according to claim 10, characterized in that, in order to separate the low frequency component of the ground contact pattern determination signal, the separation section comprises a first separation circuit including two or more low-pass filters or band-pass filters having a different pass band and configured to combine and output electrical signals outputted from each filter.

16. The sensor unit according to claim 15, characterized in that the filter is an active type filter.

17. The sensor unit according to claim 10, characterized in that, in order to separate the high frequency component of the ground contact pattern determination signal, the separation circuit comprises second separation circuit including two or more high-pass filters or band-pass filters having a different pass band and configured to combine and output electrical signals outputted from each filter.

18. The sensor unit according to claim 17, characterized in that the filter is an active type filter.

19. A tire characterized by comprising a sensor unit according to claim 10.

* * * * *